US009808767B2

(12) United States Patent
Tabayashi et al.

(10) Patent No.: US 9,808,767 B2
(45) Date of Patent: Nov. 7, 2017

(54) SEPARATION MEMBRANE ELEMENT

(71) Applicant: TORAY INDUSTRIES, INC., Tokyo (JP)

(72) Inventors: Shunsuke Tabayashi, Ehime (JP); Hiroho Hirozawa, Otsu (JP); Kentaro Takagi, Otsu (JP); Yoshie Marutani, Otsu (JP); Yoshiki Okamoto, Otsu (JP); Hiroyuki Yamada, Otsu (JP); Shuji Furuno, Otsu (JP); Takao Sasaki, Otsu (JP); Masahiro Kimura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 15/032,755

(22) PCT Filed: Oct. 31, 2014

(86) PCT No.: PCT/JP2014/079110
§ 371 (c)(1),
(2) Date: Apr. 28, 2016

(87) PCT Pub. No.: WO2015/064752
PCT Pub. Date: May 7, 2015

(65) Prior Publication Data
US 2016/0303514 A1 Oct. 20, 2016

(30) Foreign Application Priority Data

Oct. 31, 2013 (JP) .................................. 2013-226340
Dec. 26, 2013 (JP) .................................. 2013-268548
Jun. 26, 2014 (JP) .................................. 2014-131409

(51) Int. Cl.
*B01D 63/10* (2006.01)
*C02F 1/44* (2006.01)
*C02F 103/08* (2006.01)

(52) U.S. Cl.
CPC .............. *B01D 63/103* (2013.01); *C02F 1/44* (2013.01); *B01D 2313/146* (2013.01); *C02F 2103/08* (2013.01)

(58) Field of Classification Search
CPC ... B01D 2313/146; B01D 63/103; C02F 1/44; C02F 2103/08
See application file for complete search history.

(56) References Cited

U.S. PATENT DOCUMENTS 8,883,007 B2   11/2014   Buser
2008/0156718 A1   7/2008   Larsen
(Continued)

FOREIGN PATENT DOCUMENTS

EP   2868365 A1   5/2015
EP   3064266 A1   9/2016
(Continued)

OTHER PUBLICATIONS

Rozelle, L.T., et al., Development of New Releases Osmosis Membrane for Desalination, Oct. 1968, pp. 1-60, Research and Development Progress Report, No. 359.
(Continued)

Primary Examiner — John Kim
(74) Attorney, Agent, or Firm — RatnerPrestia

(57) ABSTRACT

A separation membrane element of the present invention includes: a water collection tube; and a plurality of separation membrane leaves stacked on each other and wound around the water collection tube, each of the separation membrane leaves includes one or more separation membranes each having a feed-side face and a permeate-side face and is configured so that the feed-side faces face each other, and a sheet having a plurality of projections fixed thereto is provided between the permeate-side faces of the separation membrane leaves stacked on each other. Regarding a height
(Continued)

of the projections, a ratio of the maximum height to the minimum height is from 1.10 to 1.50, and a variation coefficient of the height is from 0.02 to 0.15, and an impregnation ratio of the projections into the sheet is from 10% to 100%.

5 Claims, 8 Drawing Sheets

(56) References Cited

U.S. PATENT DOCUMENTS

| | | |
|---|---|---|
| 2012/0261333 A1 | 10/2012 | Moran |
| 2014/0151286 A1 | 6/2014 | Hirozawa |
| 2014/0231332 A1 | 8/2014 | Hirozawa et al. |
| 2014/0251896 A1 | 9/2014 | Hirozawa et al. |
| 2016/0271564 A1* | 9/2016 | Yamada .................. B01D 69/12 |

FOREIGN PATENT DOCUMENTS

| | | |
|---|---|---|
| JP | 4414216 | 6/1969 |
| JP | 04011928 | 1/1992 |
| JP | 11226366 | 8/1999 |
| JP | 2000051671 | 2/2000 |
| JP | 2002095935 | 4/2002 |
| JP | 2006247453 | 9/2006 |
| JP | 2008531270 | 8/2008 |
| JP | 2012518538 | 8/2012 |
| WO | 2013005826 | 1/2013 |
| WO | 2013047744 A1 | 4/2013 |

OTHER PUBLICATIONS

International Search Report and Written Opinion of the International Searching Authority for International Application No. PCT/JP2014/079110 dated Jan. 27, 2015.
Chinese Office Action for Chinese Application No. 201480059812.1, dated Feb. 4, 2017, including English translation, 13 pages.
Extended European Search Report for European Application No. 14858236.4, dated Jun. 27, 2017, 10 pages.

* cited by examiner

INSIDE ←→ OUTSIDE
MD

SEPARATION MEMBRANE ELEMENT

CROSS REFERENCE TO RELATED APPLICATIONS

This is the U.S. National Phase application of PCT International Application No. PCT/JP2014/079110, filed Oct. 31, 2014, and claims priority to Japanese Patent Application No. 2013-226340, filed Oct. 31, 2013, Japanese Patent Application No. 2013-268548, filed Dec. 26, 2013, and Japanese Patent Application No. 2014-131409, filed Jun. 26, 2014, the disclosures of each of these applications being incorporated herein by reference in their entireties for all purposes.

FIELD OF THE INVENTION

The present invention relates to a separation membrane element for use in separation of ingredients contained in fluid such as liquid and gas.

BACKGROUND OF THE INVENTION

In the recent technique for removal of ionic substances contained in seawater, brackish water or the like, separation methods utilizing separation membrane elements have found increasing uses as processes for energy savings and conservation of resources. Separation membranes adopted in the separation methods utilizing separation membrane elements are classified into five groups according to their pore sizes and separation performance, namely microfiltration membranes, ultrafiltration membranes, nanofiltration membranes, reverse osmosis membranes and forward osmosis membranes. These membranes have been used in e.g. production of drinkable water from seawater, brackish water or water containing deleterious substances, production of ultrapure water for industrial uses, effluent treatment, recovery of valuable substances, or the like, and membranes to be used therein have been changed to suit ingredients targeted for separation and separation performance requirements.

Separation membrane elements can have a wide variety of shapes, but they have commonality in the sense that water to be treated (raw water) is fed to one surface of a separation membrane and a permeated fluid is obtained from the other surface of the separation membrane. By having a plurality of separation membranes tied in a bundle, each separation membrane element is configured to extend the membrane area per separation membrane element, or equivalently, to increase the amount of a permeated fluid obtained per separation membrane element. Various types of shapes, such as those of a spiral type, a hollow fiber type, a plate-and-frame type, a rotating flat-membrane type and flat-membrane integration type, have been proposed for separation membrane elements in keeping with their intended uses and purposes.

For example, spiral-type separation membrane elements have been widely used in reverse osmosis filtration. Each spiral-type separation membrane element is provided with a central tube and a stack wound up around the central tube. The stack is formed by stacking a feed-side channel member for feeding raw water (that is, water to be treated) to the surface of a separation membrane, a separation membrane for separating ingredients contained in the raw water and a permeate-side channel member for leading, into the central tube, a permeate-side fluid having been separated from the feed-side fluid by passing through the separation membrane.

In the spiral-type separation membrane element, it is possible to apply pressure to raw water, whereby it becomes possible to take out a permeated fluid in greater quantity. In this respect, the use of spiral-type one is advantageous.

In the spiral-type separation membrane element, a net made mainly from a polymer compound has been generally used as the feed-side channel member in order to form a flow channel for a feed-side fluid. In addition, a multilayer-type separation membrane has been used as the separation membrane. The multilayer-type separation membrane is a separation membrane including a separation functional layer (porous supporting layer) formed from a cross-linked polymer compound such as polyamide, a porous resin layer formed from a polymer compound such as polysulfone, and a nonwoven fabric substrate made from a polymer compound such as polyethylene terephthalate, in which these layers are stacked in the order mentioned, from the feed side toward the permeate side. And as a permeate-side channel member, a knitting member referred to as tricot finer in mesh than the feed-side channel member has been used for the purposes of preventing the separation membrane from sinking and of forming a permeate-side flow channel.

As demands for reduction in cost of fresh water production have grown in recent years, membrane elements having higher performance have been required. For example, with the intention of improving separation performance of separation membrane elements and increasing the amount of permeated fluid per unit time, improvements in performance of separation membrane element members, such as channel members, have been suggested.

Specifically, a separation membrane element having a sheet embossed with an uneven pattern as a permeate-side channel member has been proposed (see Patent Document 1). Also a separation membrane element requiring neither a feed-side channel member such as net nor a permeate-side channel member such as tricot has been proposed by arranging a channel member formed of an elastomer called a vane in the separation membrane (see Patent Document 2). Further, a separation membrane element having a channel member with yarns arranged on a nonwoven fabric, has been proposed (see Patent Document 3).

PATENT DOCUMENT

Patent Document 1: JP-A-2006-247453
Patent Document 2: JP-T-2012-518538
Patent Document 3: US 2012/0261333

SUMMARY OF THE INVENTION

However, despite the above-mentioned various proposals, it cannot be said that existing separation membrane elements are sufficient in separation performance, especially in performance stability during long-term operation under highly pressurized conditions, and there is still room for improvement.

Therefore, an object of the present invention is to provide a separation membrane element which allows stabilization of separation-and-removal performance during long-term operation of the separation membrane element under highly pressurized conditions.

The present invention aims to achieve the above-mentioned object, and the separation membrane element of the present invention includes the following configurations.

(1) A separation membrane element including: a water collection tube; and a plurality of separation membrane leaves stacked on each other and wound around the water collection tube, in which each of the separation membrane leaves includes one or more separation membranes each having a feed-side face and a permeate-side face and is configured so that the feed-side faces face each other, a sheet having a plurality of projections fixed thereto is provided between the permeate-side faces of the separation membrane leaves stacked on each other, regarding a height of the projections, a ratio of the maximum height to the minimum height is from 1.10 to 1.50, and a variation coefficient of the height is from 0.02 to 0.15, and an impregnation ratio of the projections into the sheet is from 10% to 100%.

(2) The separation membrane element according to (1), in which the sheet having the projections fixed thereto has a tensile strength in a lengthwise direction thereof of from 50 N/5 cm to 800 N/5 cm.

(3) The separation membrane element according to (1) or (2), which has a plurality of sheets between the permeate-side faces of the separation membrane leaves stacked on each other, in which the plurality of projections are fixed to at least one of the sheets.

(4) The separation membrane element according any one of (1) to (3), in which the projections each have a lower bottom length on a side where the projections are fixed to the sheet, which is larger than a upper bottom length thereof, and the projections are arranged so that a face of the sheet not having the plurality of projections is kept in contact with the permeate-side face of the separation membrane leaf.

(5) The separation membrane element according any one of (1) to (4), in which the sheet has the tensile strength in the lengthwise direction thereof of from 40 N/5 cm to 600 N/5 cm, a tensile strength in a widthwise direction thereof of from 15 N/5 cm to 500 N/5 cm, a tensile elongation in the lengthwise direction thereof of from 5% to 50%, and a tensile elongation in the widthwise direction thereof of from 3% to 40%.

According to the present invention, it is possible to form a high-efficiency and stable permeate-side flow channel, whereby a high-performance and high-efficiency separation membrane element having the capability of removal of separated ingredients and high permeation performance can be obtained.

By using the separation membrane element in a water treating apparatus, it is expected to continue stable operation in desalination of brackish water and seawater for a long period of time even under high-pressure operation conditions.

Also according to the present invention, the separation membrane can be prevented from sinking into the permeate-side flow channel to thereby reduce the flow resistance on the permeate side, and therefore a high-efficiency and stable permeate-side flow channel can be formed and a high-performance and high-efficiency separation membrane element having the capability of removal of separated ingredients and high permeation performance can be obtained.

By using the separation membrane element in a water treating apparatus, it is expected to prevent the separation membrane from sinking between the channel members and to continue stable operation in desalination of brackish water and seawater for a long period of time even under high-pressure operation conditions.

DETAILED DESCRIPTION OF EMBODIMENTS OF THE INVENTION

Next, embodiments of the separation membrane element of the present invention are described in detail.

Figure 1:
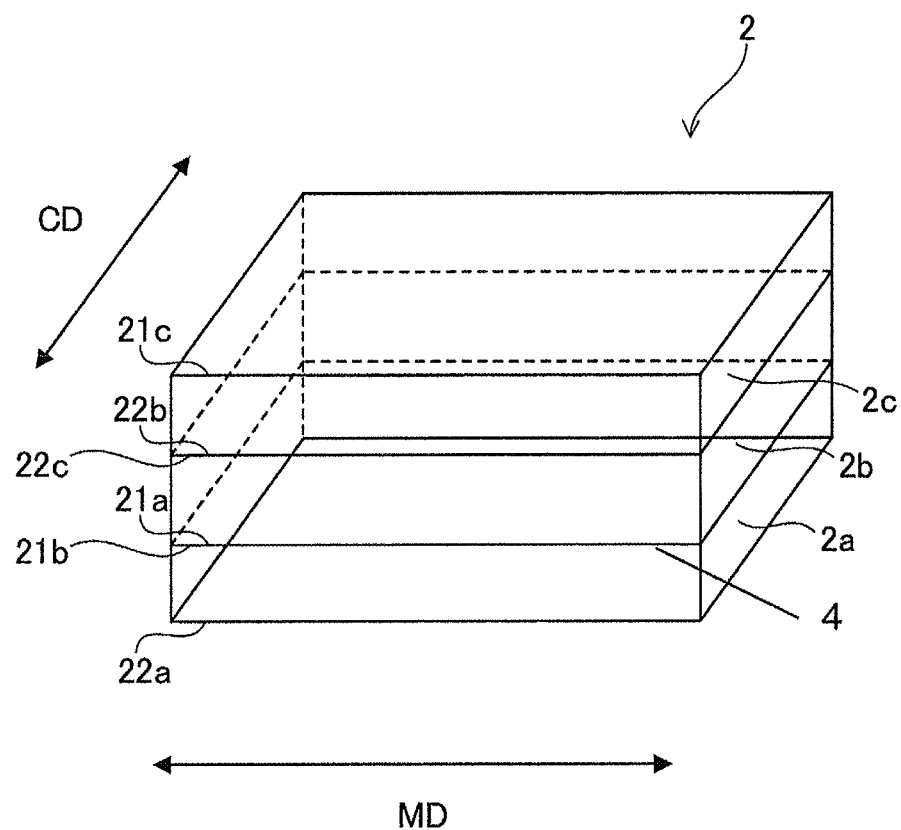
FIG. 1 is a schematic diagram showing one configuration of a separation membrane leaf for use in the present invention.
Figure 8A:
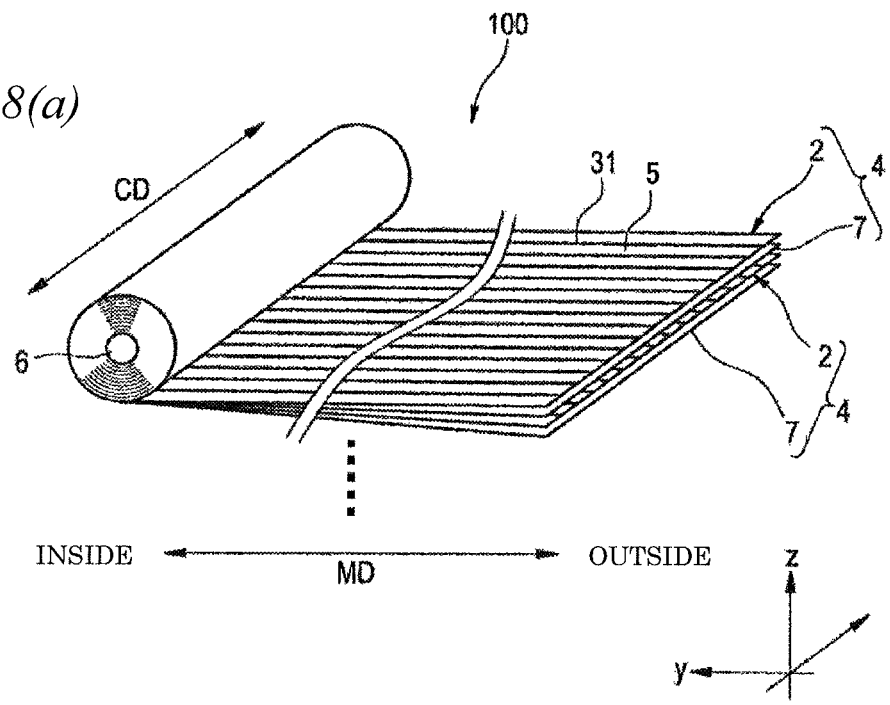
FIG. 8(a) and FIG. 8(b) each are a developed perspective view showing one configuration of a separation membrane element of the present invention.
Figure 8B:
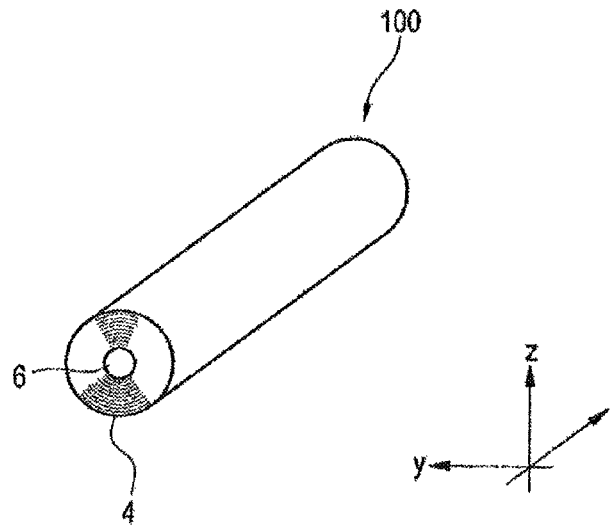
Figure 9:
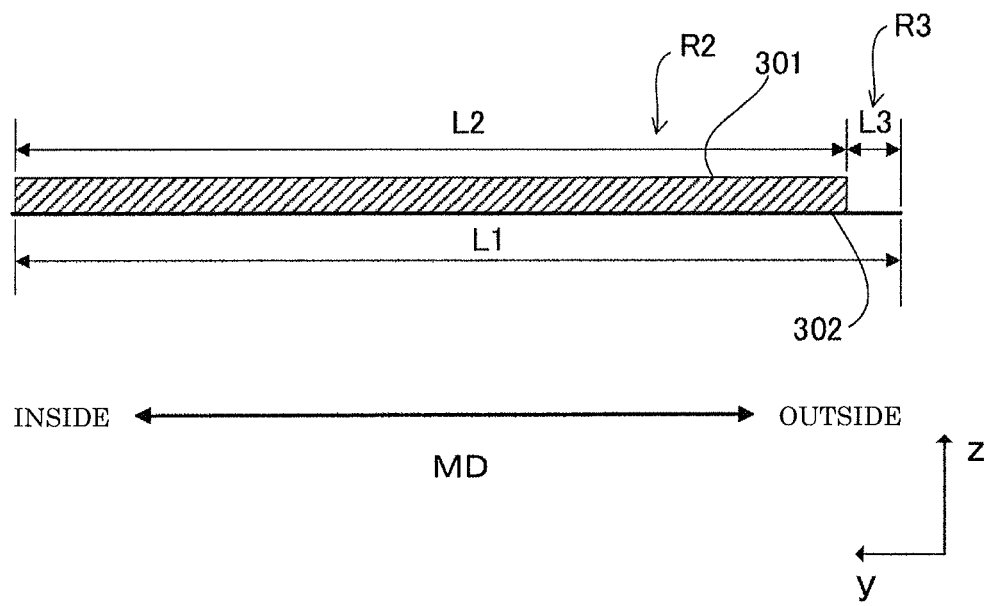
FIG. 9 is a cross-sectional schematic diagram of an embodiment of a permeate-side channel member for use in the present invention.

In FIG. 1 to FIG. 9, directional axes of x-axis, y-axis and z-axis are shown in each drawing. The x-axis may be referred to as the first direction, and the y-axis may be as the second direction. Also, the first direction may be referred to as a cross direction or a widthwise direction, and the second direction may be as a machine direction or a lengthwise direction. In FIG. 1, FIG. 8 and FIG. 9, the first direction (cross direction) is expressed by the arrow of CD, and the second direction (machine direction) is by the arrow of MD.

In this description, "mass" means "weight".

The separation membrane element of an embodiment of the present invention is a separation membrane element including: a water collection tube; and a plurality of separation membrane leaves stacked on each other and wound around the water collection tube, in which each of the separation membrane leaves includes one or more separation membranes each having a feed-side face and a permeate-side face and is configured so that the feed-side faces face each other, and a sheet having a plurality of projections fixed thereto is provided between the permeate-side faces of the separation membrane leaves stacked on each other.

[1. Separation Membrane]

(1-1) Outline of Separation Membrane

The separation membrane refers to the membrane which makes it possible to separate ingredients contained in a fluid fed to the surface of the separation membrane and to obtain a permeated fluid having permeated therethrough. The separation membrane as referred to in the present invention includes embossed ones as well as resin-arranged ones to form flow channels. On the other hand, as conventionally, one that could not form a flow channel but expresses only a separation function may be referred to as a separation membrane main body.

As an example of such a separation membrane, FIG. 1 shows an exploded perspective view of a separation membrane leaf including one example of an embodiment of the separation membrane for use in the present invention. In FIG. 1, the separation membrane 2 includes a plurality of separation membranes 2a, 2b and 2c. The first separation membrane 2a has a feed-side face 21a and a permeate-side face 22a; the second separation membrane 2b has a feed-side face 21b and a permeate-side face 22b; and the third separation membrane 2c has a feed-side face 21c and a permeate-side face 22c. The first separation membrane 2a and the second separation membrane 2b stacked on each other are so configured that the feed-side face 21a of the first separation membrane 2a faces the feed-side face 21b of the second separation membrane 2b. Additionally, the third separation membrane 2c further stacked thereon is so configured that the permeate-side face 22c thereof faces the permeate-side face 22b of the second separation membrane 2b. The feed-side face 21c of the third separation membrane 2c is the feed-side face of the separation membrane 2.

In the present invention, the term "feed-side face" of a separation membrane refers to the surface which is one of the two faces of a separation membrane and is the side to which raw water is to be fed. The term "permeate-side face" refers to the face on the opposite side, which is the surface through which the permeated fluid having passed through the separation membrane is discharged out. As described below, in a case where the separation membrane 2 includes a substrate 201, a porous supporting layer 202 and a separation functional layer 203 as shown in FIG. 10, in general, the face on the side of the separation functional layer 203 is the feed-side face 21 and the face on the side of the substrate 201 is the permeate-side face 22.

Figure 10:
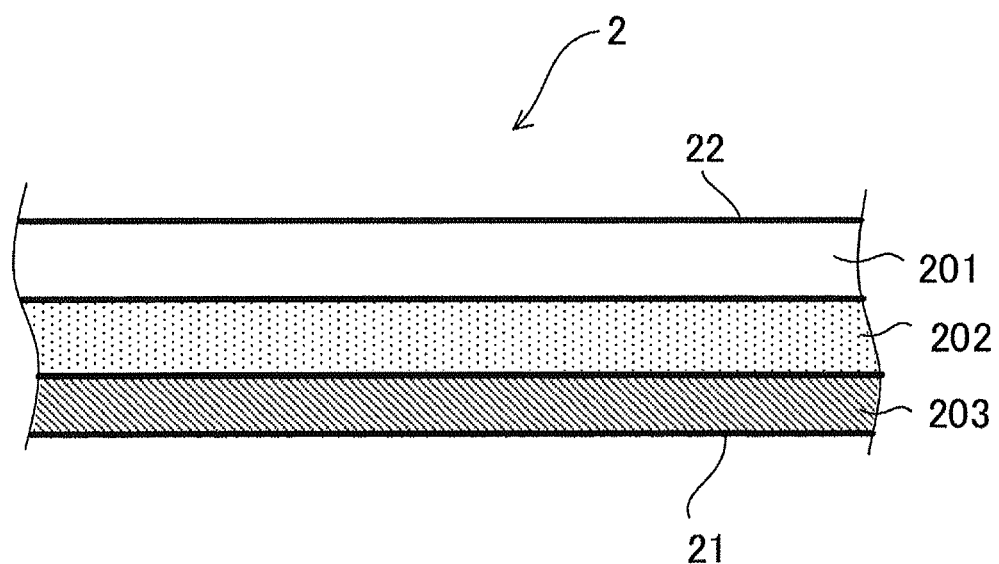
FIG. 10 is a cross-sectional view showing an outline configuration of a separation membrane main body for use in the present invention.

In FIG. 10, the separation membrane 2 is expressed as a stack of a substrate 201, a porous supporting layer 202 and a separation functional layer 203. As described above, the face opened outside the separation functional layer 203 is the feed-side face 21, and the face opened outside the substrate 201 is the permeate-side face 22.

As shown in FIG. 1, etc., the separation membrane 2 has a rectangular shape, and the first direction (CD) and the second direction (MD) are parallel to the outer edges of the separation membrane 2, respectively.

(1-2) Separation Membrane

<Outline>

As the separation membrane, a membrane having separation performance appropriate to the usage and intended purpose thereof and so on is used. The separation membrane may be formed into a single layer, or it may be formed into a composite membrane including a separation functional layer and a substrate. As shown in FIG. 10, the composite membrane may include a porous supporting layer 202 formed between the separation functional layer 203 and the substrate 201.

<Separation Functional Layer>

In one preferred embodiment, the thickness of the separation functional layer is in a range of 5 nm to 3,000 nm in view of separation performance and the permeation performance. In the cases of a reverse osmosis membrane, a forward osmosis membrane and a nanofiltration membrane in particular, it is preferable that each membrane has a thickness of 5 nm to 300 nm.

The thickness of the separation functional layer can be determined in conformance with any of traditional methods to measure separation membrane thickness. For example, a separation membrane is embedded in a resin, and cut into ultrathin slices. The slices obtained are subjected to some treatment, such as dyeing. Then, they are observed with a transmission electron microscope, whereby thickness measurements become possible. When the separation functional layer has a pleated structure, on the other hand, the thickness thereof can be determined by making height measurements on 20 pleats at intervals of 50 nm in the direction of cross-sectional length of the pleated structure located above the porous supporting layer and calculating the average of these heights measured.

The separation functional layer may be a layer having both a separation function and a support function, or it may be a layer having a separation function alone. Additionally, the term "separation functional layer" refers to the layer having at least a separation function.

When the separation functional layer has both a separation function and a support function, a layer containing cellulose, polyvinylidene fluoride, polyether sulfone or polysulfone as a main component is preferably applied to such a separation functional layer.

Additionally, in the present invention, the expression of "X containing Y as a main component" means that the content of Y in X is 50% by mass or higher, preferably 70% by mass or higher, more preferably 80% by mass or higher, still more preferably 90% by mass or higher, and most preferably 95% by mass or higher. In the case where two or more components correspond to Y, the total content of those components falls within the foregoing ranges.

On the other hand, for the separation functional layer supported by a porous supporting layer, a crosslinked polymer compound is preferably used from the viewpoint of easy pore size control and excellent durability. In particular, from the viewpoint of excellent performance of separation of components in raw water, a polyamide separation functional layer formed through polycondensation of a polyfunctional amine and a polyfunctional acid halide, an organic-inorganic hybrid functional layer or the like is favorably used. These separation functional layers may be formed through polycondensation of monomers on a porous supporting layer.

For example, the separation functional layer may contain a polyamide as the main component. The membrane of the type may be formed through interfacial polycondensation of a polyfunctional amine and a polyfunctional acid halide according to a known method. For example, an aqueous solution of a polyfunctional amine is applied onto a porous supporting layer, the excessive aqueous amine solution is removed with an air knife, and thereafter an organic solvent solution containing a polyfunctional acid halide is applied thereon to form a polyamide separation functional layer.

The separation functional layer may have an organic-inorganic hybrid structure containing a Si element or the like. The separation functional layer having an organic-inorganic hybrid structure can contain e.g. the following compounds (A) and (B):

(A) a silicon compound containing a silicon atom to which a reactive group having an ethylenic unsaturated group and a hydrolysable group are directly bonded, and (B) an ethylenic unsaturated group-containing compound other than the compound (A).

Specifically, the separation functional layer may contain a condensation product of the hydrolysable group in the compound (A) and polymerization products of the ethylenic unsaturated groups in the compound (A) and/or the compound (B). More specifically, the separation functional layer may contain at least one of the following polymerization products:

polymerization products formed through the condensation and/or the polymerization of the compound (A) alone;

polymerization products formed through the polymerization of the compound (B) alone; and products formed through the copolymerization of the compound (A) and the compound (B).

Additionally, condensates are included in the polymerization products. And the compound (A) may undergo condensation via its hydrolysable group in the interior of the compound (A)-compound (B) copolymer.

The hybrid structure can be formed by any of publicly known methods. One example of hybrid structure-forming methods is as follows. A reaction solution containing the compound (A) and the compound (B) is applied to a porous supporting layer. The excess of the reaction solution is removed, and then heat treatment may be carried out for the purpose of condensing hydrolysable groups. As the method for polymerizing ethylenic unsaturated groups in the compound (A) and the compound (B), heat treatment, electromagnetic-wave irradiation, electron-beam irradiation or plasma irradiation may be adopted. For the purpose of increasing the polymerization speed, a polymerization initiator, a polymerization accelerator and the like can be added at the occasion of forming the separation functional layer.

Additionally, regarding any of the separation functional layers, the membrane surface thereof, before being used, may be rendered hydrophilic e.g. by an aqueous solution containing alcohol, an alkaline aqueous solution or the like.

<Porous Supporting Layer>

The porous supporting layer is a layer which supports the separation functional layer, and can translate into a porous resin layer.

The porous supporting layer has no particular restrictions on materials used therein and shape thereof. For example, the porous supporting layer may be formed on a substrate through the use of a porous resin. In forming the porous supporting layer, polysulfone, cellulose acetate, polyvinyl chloride, epoxy resin, or a mixture or a laminate of any two or more thereof can be used. Among them, however, polysulfone is preferably used in view of high chemical, mechanical and thermal stability and easiness of pore-size control.

The porous supporting layer imparts mechanical strength to the separation membrane, and unlike the separation membrane it has no separation function for molecular-size fine components, such as ions. Regarding the pore size and the pore distribution in the porous supporting layer, for example, the porous supporting layer may have uniform fine pores, or it may have such a size distribution that pores gradually increase in size from the surface on the side where the separation functional layer is formed to the other face. In either case, the projected area diameter of fine pores present at the surface on the side where the separation functional layer is formed is preferably 1 nm to 100 nm as determined through the use of an atomic force microscope or an electron microscope. In view of interfacial polymerization reactivity and retention of the separation functional layer in particular, it is preferable that the pores present at the surface of the porous supporting layer on the side where the separation functional layer is formed have projected area diameters ranging 3 nm to 50 nm.

The thickness of the porous supporting layer is, on the ground that it should impart strength to the separation membrane, preferably within a range of 20 μm to 500 μm, more preferably 30 μm to 300 μm.

The configuration of the porous supporting layer can be observed with a scanning electron microscope, a transmission electron microscope or an atomic force microscope. For instance, when the observation is made with a scanning electron microscope, a sample for cross-section observations is made by peeling off the porous supporting layer from the substrate, and cutting the peeled-off layer in accordance with a freeze fracture method. This sample is coated with a thin film of platinum, platinum-palladium or ruthenium tetrachloride, preferably ruthenium tetrachloride, and observed with an ultrahigh-resolution field-emission scanning electron microscope (UHR-FE-SEM) under an acceleration voltage of 3 kV to 6 kV. As the ultrahigh-resolution field-emission scanning electron microscope, it is possible to use e.g. an electron microscope Model S-900 manufactured by Hitachi Ltd. On the basis of electron micrographs obtained in such a manner, the thickness of the porous supporting layer and the projected area diameters of pores on the surface of the porous supporting layer can be determined.

The thickness and the pore diameter of the porous supporting layer are represented as their respective average values. Specifically, the thickness of the porous supporting layer is an average value obtained by making thickness measurements at 20 points chosen at intervals of 20 μm in the direction orthogonal to the thickness direction in cross-section observation and averaging out the measurement values. And the pore diameter is an average value obtained by making projected area diameter measurements on 200 pores and averaging out the measurement values.

Then a method for forming the porous supporting layer is described. The porous supporting layer can be formed e.g. by casting a N,N-dimethylformamide (hereinafter abbreviated as DMF) solution of polysulfone as mentioned above in a uniform thickness onto a substrate as mentioned below, such as a tightly woven polyester fabric or a nonwoven fabric, and subjecting the cast solution to wet coagulation in water.

The porous supporting layer can be formed in accordance with the method described in "Office of Saline Water Research and Development Progress Report", No. 359 (1968). Therein, suitable adjustments to the polymer concentration, the solvent temperature and the poor solvent can be made in order to obtain the desired configuration.

For instance, the porous supporting layer can be obtained by taking the following steps. Polysulfone resin solution having a predetermined concentration is prepared by dissolving a predetermined amount of polysulfone in DMF, and an almost uniform coat of the thus prepared polysulfone resin solution is applied to a substrate of a polyester fabric or a nonwoven fabric, then left standing in the air for a certain length of time to remove the solvent on the surface, and further immersed in a coagulating solution to coagulate the polysulfone.

<Substrate>

The separation membrane may have a substrate from the standpoint of e.g. its strength and dimensional stability. As to the substrate, a fibrous substrate is preferably used in view of strength, ability to form asperities and fluid permeability.

Both a long-fiber nonwoven fabric and a short-fiber nonwoven fabric can be suitably used as the fibrous substrate. The long-fiber nonwoven fabric in particular has an excellent membrane-forming property, and therefore prevents the possibilities that, when a polymer solution is flow-cast onto the fabric, the solution may permeate to the backside of the fabric and the porous supporting layer may peel off because of overpermeation of the solution, and further can inhibit the membrane formed thereon from becoming nonuniform owing to fluffiness of the substrate and defects including pinholes and the like. In addition, the case of using as the fibrous substrate a long-fiber nonwoven fabric made up of thermoplastic continuous filaments can reduce unevenness caused by fluffiness of fibers and membrane defects produced at the time of flow-cast of a polymer solution as compared with the case of using a short-fiber nonwoven fabric. Further, when the separation membrane is formed continuously, it is appropriate to use a long-fiber nonwoven fabric superior in dimensional stability because tension is applied to the direction in which a membrane is being formed.

In terms of formability and strength, it is advantageous for fibers of the substrate formed of a long-fiber nonwoven fabric to be longitudinally oriented more in the surface layer on the side opposite to the porous supporting layer side than in the surface layer on the porous supporting layer side. Having such a configuration is advantageous because it allows not only retention of strength, thereby achieving high effect on prevention of membrane failure and the like, but also improvement in ability to form into a laminate including a porous supporting layer and a substrate at the occasion of giving asperities to a separation membrane, thereby stabilizing an uneven surface profile of the separation membrane.

More specifically, in the substrate formed of a long-fiber nonwoven fabric, the degree of fiber orientation in the surface layer on the side opposite to the porous supporting layer side is preferably from 0° to 25°. In addition, the difference in the degree of fiber orientation between the surface layer on the side opposite to the porous supporting layer side and that on the porous supporting layer side is preferably from 10° to 90°.

In a process of making a separation membrane and in a process of making a separation membrane element, heating steps are included. And there may occur a phenomenon in which a porous supporting layer or a separation functional layer shrinks when heated. This phenomenon is remarkable in the widthwise direction in particular to which no tension is applied in continued membrane formation. The shrinkage of the separation membrane causes a problem in dimensional stability or the like, and it is therefore preferred that the substrate is low in ratio of dimensional change by heat. Cases where the difference in degree of fiber orientation between the surface layer on the side opposite to the porous supporting layer side and the surface layer on the porous supporting layer side is in a range of 10° to 90° are preferred embodiments because they can also inhibit thermal changes in the widthwise direction.

The term "degree of fiber orientation" used in this description refers to the index indicating orientations of fibers in a nonwoven fabric substrate incorporated in the porous supporting layer. In the concrete, the degree of fiber orientation is an average value of angles between the machine direction in continuous membrane formation, that is, the longitudinal direction of a nonwoven fabric direction and the longitudinal direction of fibers constituting the nonwoven fabric substrate. More specifically, when the longitudinal direction of the fibers is parallel to the machine direction in membrane formation, the degree of fiber orientation is 0°. On the other hand, when the longitudinal direction of fibers is orthogonal to the machine direction in membrane formation, or parallel to the widthwise direction of a nonwoven fabric substrate, the degree of fiber orientation is 90°. Thus the degree of fiber orientation nearer to 0° indicates that the directions of fibers are the nearer to the longitudinal direction, and the degree of fiber orientation nearer to 90° indicates that the directions of fibers are the nearer to the lateral direction.

The degree of fiber orientation is determined in the following manner. To begin with, 10 small sample pieces are randomly taken from a piece of nonwoven fabric. Then, photographs of surfaces of these pieces are taken with a scanning electron microscope set at a magnification of 100 to 1,000 times. From the photographs taken, 10 fibers per sample piece are chosen and the angle in the longitudinal direction of the fibers when the angle in the longitudinal direction of the nonwoven fabric is taken as 0° C. is measured. The longitudinal direction of a nonwoven fabric indicates the "machine direction" in nonwoven fabric production. The longitudinal direction of a nonwoven fabric is the same as the machine direction in production of a porous supporting layer and corresponds to the MD direction in FIG. 1 and FIG. 8. The CD direction in FIG. 1 and FIG. 8 corresponds in the "cross direction" in nonwoven fabric production.

In that manner, angle measurements are made on 100 fibers per piece of nonwoven fabric. The average value of the angles in the longitudinal direction thus measured on the 100 fibers is calculated. The value obtained by rounding off the thus calculated average value to the first decimal place is defined as the degree of fiber orientation.

It is appropriate to adjust the substrate thickness so that the sum total of the substrate thickness and the porous supporting layer thickness falls preferably within a range of 30 μm to 300 μm, more preferably 50 μm to 250 μm.

[2. Permeate-Side Channel Member]

<Outline>

The permeate-side channel member has a sheet and a plurality of projections fixed to the sheet. The plurality of projections are formed integrally with the sheet. Having such a configuration, the permeate-side channel member can reduce the flow resistance on the permeate side and can additionally satisfy high pressure resistance.

Especially in a case where the permeate-side channel member is used in a reverse osmosis membrane element or the like, it is desirable that the permeate-side channel member of the present invention has high stiffness and strong toughness resistant to high pressure. Here, preferred stiffness is stiffness with no deformation under high operation pressure. Strong toughness is one free from breakage by instantaneous force such as pressure variation or the like. For satisfying both these characteristics of stiffness and strong toughness, the present inventors have specifically noted the tensile strength and the tensile elongation of the permeate-side channel member. As a result of assiduous studies, the present inventors have found that, even when any one alone of the tensile strength and the tensile elongation is increased, the stiffness and the strong toughness suitable for the permeate-side channel member could not enhanced, and that by increasing both the tensile strength and the tensile elongation of the permeate-side channel member, both the stiffness and the strong toughness thereof can be enhanced.

Preferably, the tensile strength in the machine direction (lengthwise direction) of the permeate-side channel member, that is, the sheet having projections fixed thereto is from 50 N/5 cm to 800 N/5 cm, and the tensile elongation thereof is from 5% to 30%. When the tensile strength and the tensile elongation of the permeate-side channel member are large, the stiffness thereof to stress given to the permeate-side channel member during high-pressure loading operation is improved. In addition, it is possible to prevent the fresh water production rate and the desalination performance from lowering owing to deformation of the channel member through concentration of the winding pressure thereto during element winding. However, when the tensile strength is too high, the texture may be rough and the strong toughness to pressure may lower. On the other hand, when the tensile elongation is too high, the deformation of the permeate-side channel member may increase and further there may occur a problem of residual strain to remain therein. When the deformation of the channel member is small, the permeate-side channel may be stable and the deformation change to pressure may be prevented. In addition, deformation of membrane or defect formation in membrane to be caused by the deformation of the channel member can be prevented, and permeate flux and solute removal performance can be stabilized even in high-pressure loading operation.

The tensile strength is measured as follows. Based on ISO9073-3:1989, a sample of 5 cm×30 cm is tested with a Tensilon universal material tester (RTF-2430) (manufactured by A & D Company). Under the condition of a chuck distance of 20 cm and a tension rate of 10 cm/min, the sample is measured at 5 points both in the longitudinal direction and the cross direction, and on the resultant strength elongation curve, the data are read. The value calculated by rounding off the resultant value to the first decimal place is defined as the tensile strength in this description.

In the present invention, it is preferable that the separation membrane element has a plurality of sheets between the permeate-side faces of the neighboring separation membrane leaves, and a plurality of projections are fixed to at least one of the sheets.

During high-pressure loading operation, the separation membrane may sink between the neighboring projections fixed to the sheet and the volume of the permeate-side flow channel may decrease and accordingly the fresh water production rate of the separation membrane element is thereby reduced.

Figure 4A:
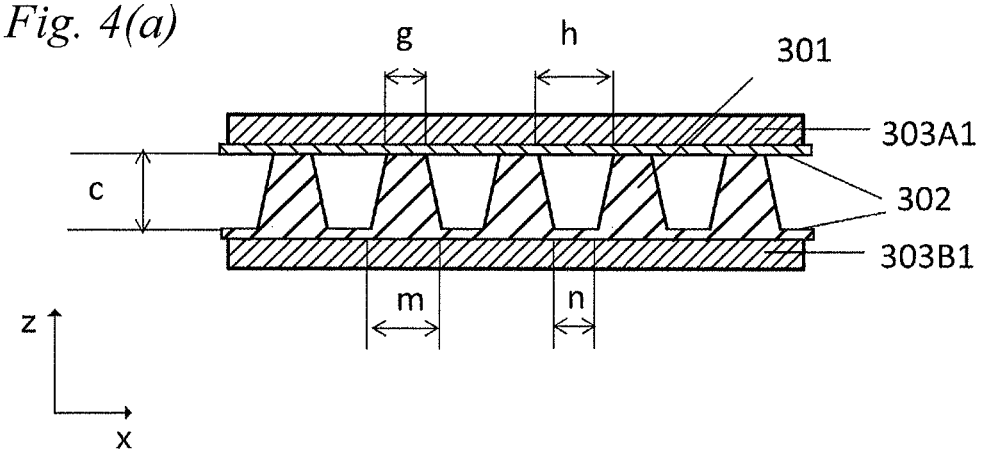
FIG. 4(a) and FIG. 4(b) each are a cross-sectional view showing an embodiment of a separation membrane having a permeate-side channel member for use in the present invention.
Figure 4B:
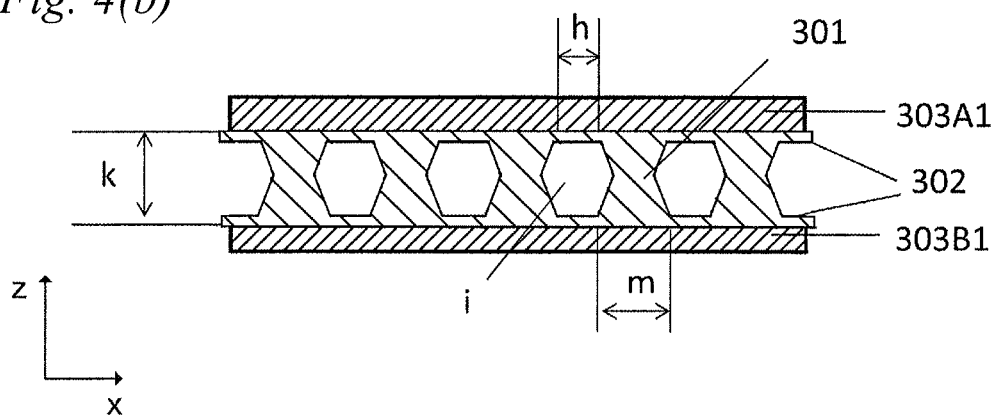

As shown in FIG. 4(a) and FIG. 4(b), when the separation membrane element has a plurality of sheets 302 between the permeate-side faces of the neighboring separation membranes 303A1 and 303B1, the stiffness to stress given to the separation membrane can be improved. When the stiffness to stress given to the separation membrane is improved, the deformation of the separation membrane under pressure thereto can be prevented and the separation membrane can be prevented from sinking, and therefore the volume of the permeate-side flow channel can be thereby prevented from reducing.

In one preferred embodiment of the projections, the width of the part thereof fixed to the sheet (lower bottom side of projection) is larger than the width of the tip part of the projection (upper bottom side of projection), and the sheet having a plurality of projections fixed thereto is so arranged that the face of the sheet not having the projections is kept in contact with the permeate-side face of the separation membrane.

Specifically, as shown in FIG. 4(a), when the projections are trapezoidal or semi-circular in such a manner that the width m of the part of the projection 301 fixed to the sheet 302 (lower bottom side of the projection) is larger than the width g of the tip part of the projection (upper bottom side of the projection), the distance h between the projections 301 on the upper bottom side (on the side of the separation membrane 303A1) is larger than the distance n between the projections 301 on the lower bottom side (on the side of the separation membrane 303B1), and therefore, the separation membrane 303A1 positioned on the upper bottom side of the projections 301 tend to sink more than the separation membrane 303B1 positioned on the lower bottom side thereof. In the configuration where the face not having the projections 301 of the sheet 302 is kept in contact with the permeate-side face of the separation membrane, the separation membrane 303A1 positioned on the upper bottom side of the projections can be prevented from sinking and the volume of the permeate-side flow channel can be thereby prevented from reducing.

Further, in a more preferred embodiment, a plurality of projections are fixed to at least two of the plurality of sheets. When the projections 301 are fixed to the sheet 302, the sheet strength is increased. Namely, the stiffness to stress given to the sheet 302 is increased. When the stiffness to stress given to the sheet is increased, the deformation of the sheet by pressure given thereto can be prevented, and the permeate-side flow channel can be thereby stabilized.

In addition, as shown in FIG. 4(b), when a sheet 302 having a plurality of projections 301 fixed thereto is so arranged that the face thereof not having the projections 301 is kept in contact with the permeate-side faces of the separation membranes 303A1 and 303B1, and when a plurality of projections 301 are fixed to at least two of the plurality of sheets 302 in the space k between the neighboring separation membranes 303A1 and 303B1, the distance h between the projections 301 positioned on the side of the separation membrane 303A1 is reduced, and therefore the separation membrane may be prevented from sinking even in high-pressure loading operation and the flow resistance may be thereby reduced. Since the separation membrane may be prevented from sinking without reducing the volume i of the permeate-side flow channel, both high initial performance and pressure resistance can be thereby satisfied.

Preferably, the tensile strength in the machine direction (lengthwise direction) of the sheet that constitutes the permeate-side channel member is from 40 N/5 cm to 600 N/5 cm, and the tensile strength in the cross direction (widthwise direction) thereof is from 15 N/5 cm to 500 N/5 cm. When the tensile strength of the sheet falls within the above range, deformation and defect formation in high-pressure loading operation can be prevented and the permeate flux and the solute removal performance can be thereby stabilized.

When the tensile strength of the sheet is large, the stiffness to stress given to the sheet can be improved. When the stiffness to stress given to the sheet is improved, the deformation of the sheet by pressure can be prevented and the permeates-side flow channel can be thereby stabilized. In addition, it is possible to prevent the fresh water production rate and the desalination performance from lowering owing to deformation of the channel member through concentration of the winding pressure thereto during element winding. Further, in the process of forming the projections on the sheet, the sheet can be prevented from deforming owing to tension and heat, and the projection formation can be stabilized. In particular, in forming high-elasticity projections, the winding tension may be increased for preventing sheet deformation to be caused by solidification of the projections. When the tensile strength of the sheet is controlled to fall within the above range, the sheet deformation under winding tension can be prevented. As a result, the shape and the height of the projections on the permeate-side channel member can be stabilized and the element formed with the sheet can secure a high water permeation rate and solute removal performance. However, when the tensile strength is too high, the flexibility may lower, and if so, the toughness to pressure may lower.

Preferably, the tensile elongation in the machine direction (lengthwise direction) of the sheet constituting the permeate-side channel member is from 5% to 50%, and the tensile elongation in the cross direction (widthwise direction) thereof is from 3% to 40%. When the tensile elongation of the sheet is controlled to fall within the range, the toughness of the sheet is increased. When the toughness of the sheet is increased, the sheet is not broken during winding pressure concentration in element winding or during high-pressure operation, and the water permeation rate and solute removal performance can be thereby stabilized. In particular, in forming high-elasticity projections, the winding tension may be increased for preventing sheet deformation to be caused by solidification of the projections. When the tensile elongation of the sheet is controlled to fall within the above range, the sheet can be stably wound. On the other hand, when the tensile elongation is too high, the sheet deformation may increase in pressure loading to elements or in the process of formation of projections on the sheet, and further there may occur a problem of residual strain remaining in the sheet.

Preferably, the thickness of the sheet constituting the permeate-side channel member is within a range of from 10 μm to 300 μm, more preferably from 20 μm to 100 μm. When the sheet thickness is 300 μm or less, the flow resistance in the permeate-side flow channel may be small and the fresh water production rate in the element may increase. When the sheet is thin, a large number of membranes may be loaded in one element so that the fresh water production rate of the element can be thereby increased. When the sheet thickness is 10 μm or more, the stiffness to stress given to the sheet may increase, and therefore the deformation of the sheet under pressure can be prevented. Accordingly, the permeate-side flow channel can be stabilized.

In addition, the sheet constituting the permeate-side channel member has voids. The air permeability of the sheet constituting the permeate-side channel member is preferably from 0.1 ml/cm$^2$/s to 10.0 ml/cm$^2$/s, more preferably from 0.1 ml/cm$^2$/s to 5.0 ml/cm$^2$/s.

When the air permeability thereof falls within the above range, the flow resistance of the sheet is small and a separation membrane element having a high fresh water production rate can be obtained. In addition, in forming projections on the sheet, the projections can be prevented from being impregnated to the backside of the sheet to thereby make the thickness of the sheet uneven.

The projections 301 constituting the permeate-side channel member are impregnated into the sheet. The impregnation ratio of the projections 301 relative to the thickness of the sheet is from 10% to 100%. The impregnation ratio is preferably from 20% to 100%. When high-pressure loading is imparted to the separation membrane element, the sheet constituting the permeate-side channel member is compressed. When the impregnation ratio of the projections 301 relative to the sheet thickness is 20% or more, the voids in the sheet may decrease and the sheet may hardly undergo compressive deformation even in high-pressure loading operation and the permeate-side flow channel may be thereby stabilized. In addition, when the impregnation ratio falls within the above range, the adhesion between the sheet and the projections may be enhanced and the projections may hardly drop off from the sheet even in high-pressure operation and the performance of the separation membrane element may be thereby stabilized.

When the impregnation ratio of the projections 301 relative to the sheet thickness is small, the voids in the sheet increase, and therefore the compression ratio of the sheet may therefore increase. When the compression ratio of the sheet increases, voids may form between the separation membrane and the permeate-side flow channel so that the separation membrane constituting the separation membrane element may be unstable. Consequently, the separation membrane may shift in the widthwise direction of the element when fluid runs through the element and therefore the separation membrane element performance may worsen. On the other hand, when the projections 301 is impregnated to the backside of the sheet, then the sheet thickness may be uneven and the permeate-side flow channel may be unstable, and there may occur some troubles of membrane movement or performance degradation in the separation membrane element.

Figure 6:
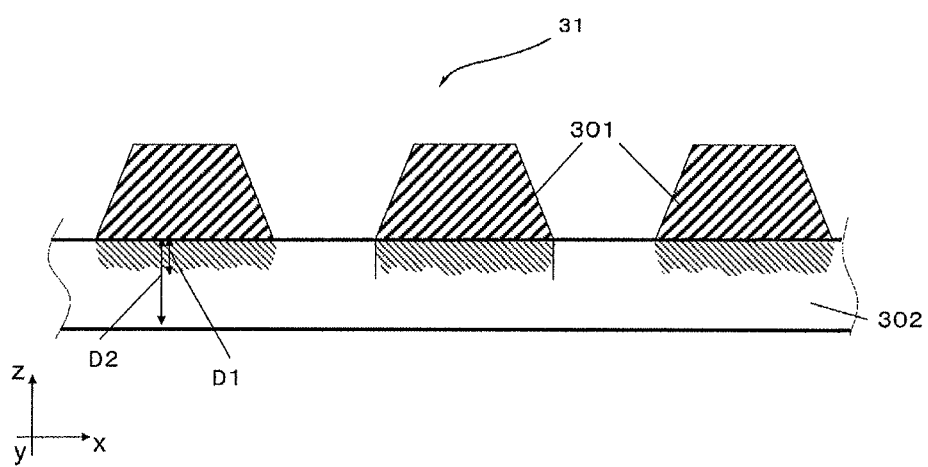
FIG. 6 is a cross-sectional view of an embodiment of a permeate-side flow channel having a sheet and projections.

The impregnation ratio of the projections into the sheet can be determined by observing the cross section of the separation membrane having projections, using a scanning electron microscope, a transmission electron microscope or an atomic force microscope, and calculating the projections-impregnated depth and the sheet thickness. For instance, when the observation is made with a scanning electron microscope, the channel member is cut along with the projections in the depth direction, and the cross section is observed with a scanning electron microscope, and the projections-impregnated depth and the substrate thickness are measured. From the ratio of the maximum projection-impregnated depth to which the projections in the sheet have been impregnated most to the sheet thickness, the impregnation ratio may be calculated. The "sheet thickness" in calculating the impregnation depth is the thickness (D2) of the sheet in the same part as the part (D1) where the maximum impregnation depth is measured (see FIG. 6). In FIG. 6, for convenience of explanation, the arrow indicating the sheet thickness is drawn to be differentiated from the arrow indicating the maximum impregnation depth.

The impregnation ratio of the projections may be controlled by varying the resin and the weight of the sheet constituting the permeate-side channel member, or the resin constituting the projections and the content thereof. In a case where the projections are provided according to a hot melting method, the impregnation ratio may also be controlled by varying the processing temperature, etc.

<Constituent Component for Permeate-Side Channel Member>

As the material constituting the permeate-side channel member, that is, the component constituting the sheet and the projections, resin is preferably used. Specifically, from the viewpoint of chemical resistance, ethylene-vinyl acetate copolymer resins, polyolefins such as polyethylene and polypropylene, as well as polyolefin copolymers and the like are preferably used. As the material for the permeate-side channel member, polymers such as urethane resin, epoxy resin, polyether sulfone, polyacrylonitrile, polyvinyl chloride, polyvinylidene chloride, polyvinyl alcohol, ethylene-vinyl alcohol copolymer, polystyrene, styrene-acrylonitrile copolymer, styrene-butadiene-acrylonitrile copolymer, polyacetal, polymethyl methacrylate, methacryl-styrene copolymer, cellulose acetate, polycarbonate, polyethylene terephthalate, polybutadiene terephthalate, fluororesin (ethylene trifluoride chloride, polyvinylidene fluoride, ethylene tetrafluoride, ethylene tetrafluoride-propylene hexafluoride copolymer, ethylene tetrafluoride-perfluoroalkoxyethylene copolymer, ethylene tetrafluoride-ethylene copolymer, etc.) and the like may be selected.

Further, a biodegradable resin is also preferably used as the starting material since it is easy to discard and its environmental load is small when the separation membrane support is discarded after use. Examples of the biodegradable resin usable in the present invention include polylactic acid resin, polybutylene succinate resin, polycaprolactone resin, polyethylene succinate resin, polyglycolic acid resin, and polyhydroxybutyrate resin. These materials may be used alone or as a mixture of two or more thereof. In particular, a thermoplastic resin is easy to mold, and can therefore form a permeate-side channel member having a uniform shape. The sheet and the projections may be formed of the same or different material.

A composite material is also applicable to the material for the permeate-side channel member. As the composite material, a material that contains the above-mentioned resin as the base material and further contains a filler may be mentioned. The compression elastic modulus of the permeate-side channel member may be increased by adding a filler such as a porous inorganic substance or the like to the base material. Specifically, sodium silicate, an alkaline earth metal silicate such as calcium silicate and magnesium silicate, a metal oxide such as silica, alumina and titanium oxide, an alkaline earth metal carbonate such as calcium carbonate and magnesium carbonate, as well as pure silica stone, silica stone powder, diatomaceous earth, wollastonite, sepiolite, attapulgite, kaolin, clay, bentonite, gypsum, talc or the like may be used as the filler. The amount of the filler to be added is not specifically limited, as long as it does not impair the advantageous effects of the present invention.

<Shape and Configuration of Channel Member>
<<Outline>>

Tricot which has so far been in wide use is a knitted cloth, and is made up of sterically-crossing yarns. More specifically, tricot has a two-dimensionally continuous structure. When such a tricot is applied to the permeate-side channel member, the height of the flow channel becomes lower than the thickness of the tricot. In other words, in this structure, the proportion not forming grooves is large.

In contrast to such a tricot, the projections 301 shown in FIG. 4 and the like are arranged on the sheet 302 having voids. Therefore the height (or thickness) of the projections 301 in this embodiment can be fully utilized as the depth of the groove of the flow channel, and further can also be used as a flow channel since the sheet 302 has voids. In addition, even in a case where the grooves are clogged owing to the projections configuration accuracy failure depending on the process of forming the permeate-side channel member, the voids in the sheet can act as a flow channel to transfer the permeate to other grooves via the sheet. Accordingly, a broader flow channel (grooves between the projections 301 and voids in the sheet 302) may exist in this embodiment than that in a case where tricot having the same thickness as the channel member in this embodiment is used, and therefore the flow resistance could be smaller.

In addition, a plurality of discontinuous projections 301 are fixed on one sheet 302 in the embodiment shown in each drawing. The term "discontinuous" signifies that a plurality of permeate-side channel members are so configured as to be spaced from each other. Namely, in the condition, when one projection 301 is peeled from the sheet 302, a plurality of projections separated from each other are obtained. As opposed to this, a member of net, tricot, film or the like form a continuous integrated shape even when the flow channel is separated from the sheet 302.

By being provided with a plurality of discontinuous projections 301, the separation membrane can suppress pressure drop when incorporated into a separation membrane element mentioned hereinafter. As to examples of such a configuration, the projections 301 in FIG. 2 are discontinuously formed only in the first direction (the widthwise direction of the sheet 302), while those in FIG. 3 are discontinuously formed in both the first direction (the widthwise direction of the sheet 302) and the second direction (the lengthwise direction of the sheet).

Figure 2:
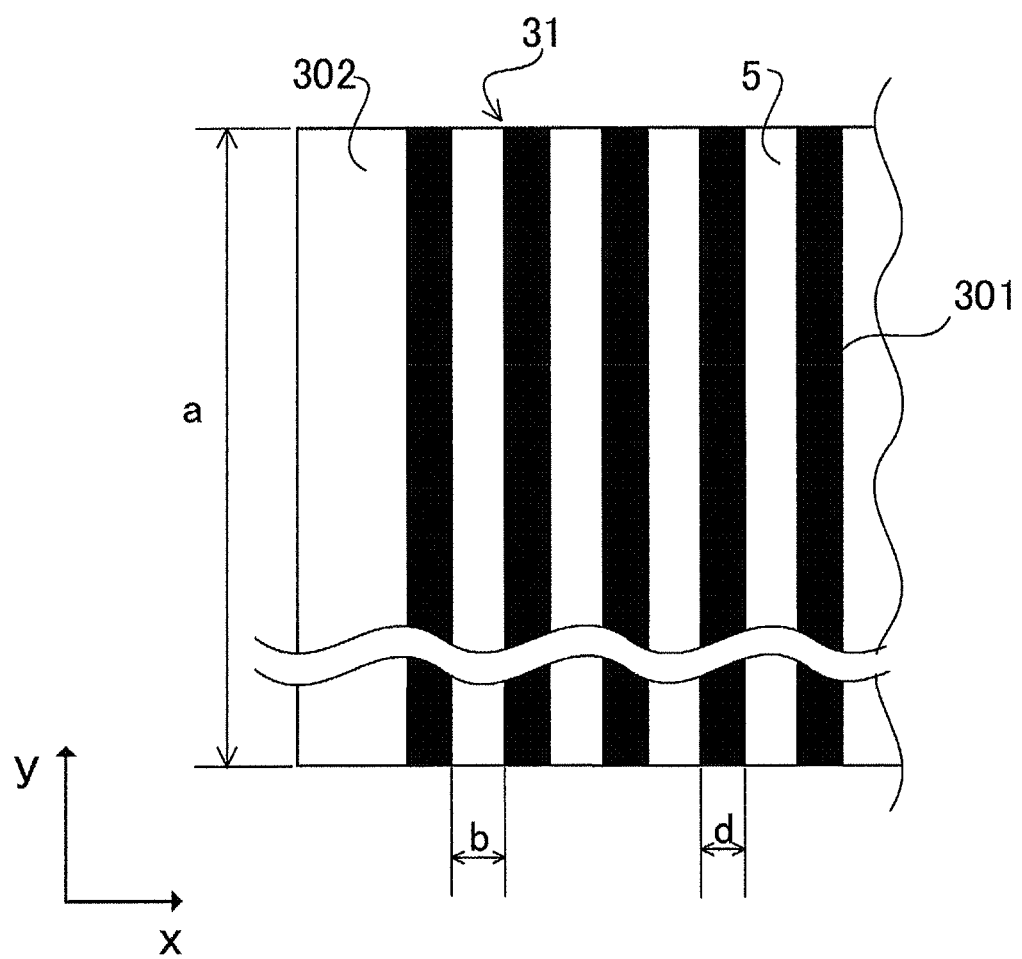
FIG. 2 is a plan view showing an embodiment of a permeate-side channel member having projections formed continuously in the lengthwise direction (second direction) of a sheet for use in the present invention.
Figure 3:
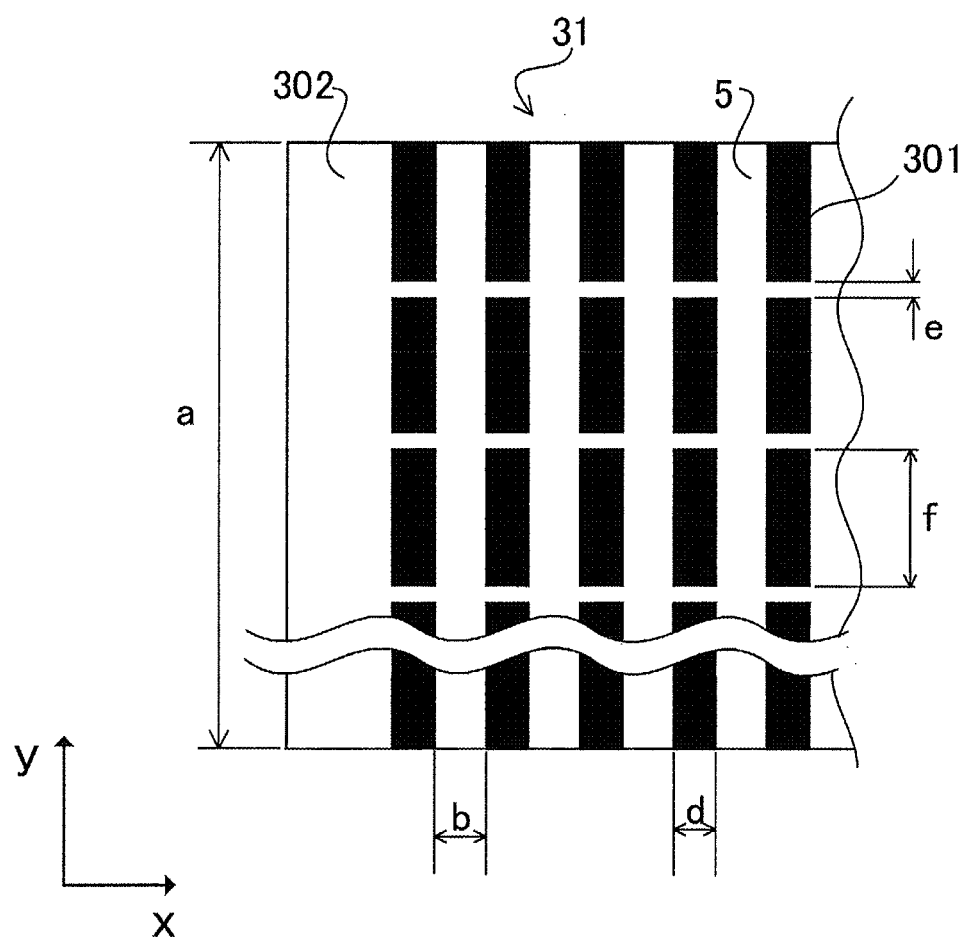
FIG. 3 is a plan view showing an embodiment of a permeate-side channel member having projections formed discontinuously in the lengthwise direction (second direction) of a sheet for use in the present invention.

In FIG. 2 and FIG. 3, the permeate-side flow channel 5 is formed in the space between the neighboring projections 301.

In one preferred embodiment of the separation membrane element, the separation membrane is so arranged that the second direction thereof corresponds to the winding direction. Namely, in the preferred embodiment of the separation membrane element, the first direction of the separation membrane (the widthwise direction of the separation membrane) is parallel to the longitudinal direction of the water collection tube, and the second direction thereof (the lengthwise direction of the separation membrane) is perpendicular to the longitudinal direction of the water collection tube.

In the embodiment shown in FIG. 2, the permeate-side channel member 31 is provided discontinuously in the first direction, and in the second direction, it is provided continuously from one end to the other end of the sheet 302. Namely, as shown in FIG. 8(a), when the separation membrane 2 is incorporated in the separation membrane element 100, the projections 301 are so arranged as to be continuous from the end on the inner side of the sheet 302 in the winding direction to the end on the outer side thereof. The inside in the winding direction is the side nearer to the water collection tube 6 in the separation membrane, and the outside in the winding direction is the side distant from the water collection tube 6 in the separation membrane.

FIG. 8(a) and FIG. 8(b) each are an explanatory view to schematically show a separation membrane element 100 in which the separation membrane leaves 4 are wound around the water collection tube 6. In FIG. 8(a), the separation membrane 2 is shown as the face on one side of the separation membrane leaf 4. In the drawing, the arrow indicated by CD shows the longitudinal direction of the water collection tube 6 and the widthwise direction of the separation membrane. The arrow indicated by MD shows the lengthwise direction of the separation membrane and the direction in which the separation membrane is wound around the water collection tube 6.

The wording "the channel member is continuously provided in the second direction" includes both the case where the channel members are provided with no interruption as in FIG. 2 and the case where the channel members are interrupted somewhere but are substantially continuous as in FIG. 3. In the "substantially continuous" embodiment, preferably, the distance e between the channel members in the second direction (namely, the length of the interrupted part in the channel member) is 5 mm or less, as shown in FIG. 3. In particular, the distance e is preferably 1 mm or less, more preferably 0.5 mm or less. The total of the distance e from the top to the tail of one channel member line running in the second direction is preferably 100 mm or less, more preferably 30 mm or less, even more preferably 3 mm or less. In the embodiment of FIG. 2, the distance e is 0 (zero).

As shown in FIG. 2, in a case where the projections 301 are provided with no interruption in the second direction, the membrane sinking in pressure filtration can be prevented. Membrane sinking means that the membrane sinks in the flow channel to narrow the flow channel.

In FIG. 3, the projections 301 are provided discontinuously not only in the first direction but also in the second direction. Namely, the projections 301 are provided with intervals in the lengthwise direction. In this connection, as described above, the projections 301 substantially continuing in the second direction can prevent membrane sinking. However, forming such discontinuous projections 301 in the two directions decreases the contact area between the channel member and fluid, and therefore the pressure drop may be thereby reduced. This embodiment may also be said as a configuration where the flow channel 5 has branch points. Namely, in the configuration of FIG. 3, the permeated fluid is divided by the projections 301 and the sheet 302 while flowing through the flow channel 5, and can be again combined in the downstream.

As described above, in FIG. 2, the projections 301 are so provided as to be continuous from one end to the other end of the sheet 302 in the second direction. In FIG. 3, the projections 301 are divided into plural parts in the second direction, and these plural parts are so arranged to align from one end to the other end of the sheet 302.

The wording "the channel member is provided from one end to the other end of sheet" includes both the case where the projections 301 are provided to run to the edge of the sheet 302 and the case where the projections 301 are not provided in a region near the edge thereof. Namely, the projections 301 may be distributed to run in the second direction in such a manner that they may form a flow channel on the permeate side, and the sheet 302 may have a region with no projections 301 provided therein. For example, in the part adhered to the separation membrane (that may be reworded as a contact part) in the permeate-side face, it is not always necessary to provide the projections 301. Because of any other reason of specifications or because of reason in production, some part such as the edge or the like of the separation membrane may have no projections 301 arranged therein.

Also in the first direction, the projections 301 may be distributed almost uniformly in the entire region of the sheet 302. However, like the distribution mode in the second direction, it is not always necessary to provide the projections 301 in the part adhering to the separation membrane in the permeate-side face. Because of any other reason of specifications or because of reason in production, some part such as the edge or the like of the sheet 302 may have no projections 301 arranged therein.

<<Dimension of Separation Membrane Main Body and Channel Member>>

In FIG. 2 to FIG. 4 and FIG. 7, the symbols a to n each indicate the following value.
a: Length of the separation membrane 2
b: Distance between the projections 301 in the widthwise direction of the separation membrane 2
c: Height of the projections 301
d: Width of the projections 301
e: Distance between the projections 301 in the lengthwise direction of the separation membrane 2
f: Length of the projection 301
g: Width of the projections 301 (upper bottom side of projections)
h: Distance between the projections 301 in the widthwise direction of the separation membrane 2 (upper bottom side of projections)
i: Cross-section area of one permeate-side flow channel
j: Membrane sinking depth (maximum distance at the position in the z direction of the separation membrane between neighboring projections)
k: Distance between the neighboring separation membranes 303A1 and 303B1
l: Distance between the neighboring separation membranes 303A1 and 303B1 (after maneuvering test)
m: Width of the projections 301 (lower bottom side of projections)
n: Distance between the projections 301 in the widthwise direction of the separation membrane 2 (lower bottom side of projections)

For measurement of the above a, b, c, d, e, f, g, h, i, j, k, l, m and n, for example, commercially-available profiling scopes or microscopes may be used. For every value, the measurement is carried out in 30 points or more in one separation membrane, and the total of the found data is divided by the total number of the measurement points to calculate the average value. In that manner, the value resulting from the measurement in at least 30 points preferably satisfies the range described below.

(Length a of Separation Membrane)

The length a of the separation membrane is the distance from one end to the other end of the separation membrane 2 in the second direction (the lengthwise direction of the separation membrane). When the distance is not constant, the distance is measured in 30 or more points in one separation membrane 2, and the average value of the found data is calculated to be the length a.

(Distance b Between the Projections 301 in the Widthwise Direction of Separation Membrane)

The distance b between the neighboring projections 301 in the first direction (widthwise direction of the separation membrane) corresponds to the width of the flow channel 5. When the width of one flow channel 5 is not constant in one cross section, that is, when the sides of the neighboring two projections 301 are not parallel to each other, the maximum value and the minimum value of the width of one flow channel 5 in one cross section are measured, and the found data are averaged to calculate the average value.

As shown in FIG. 4(a), in the case where the neighboring two projections 301 in the cross section vertical to the second direction form a trapezoidal shape whose top is thin and bottom is thick, first, the distance between the tops of the neighboring two projections 301 and the distance between the bottoms thereof are measured, and the found data are averaged to obtain an average value. In arbitrary 30 or more cross sections, the distance between the projections 301 is measured, and the average value in each cross section is calculated. With that, the arithmetic average value of the resultant average values is further calculated to be the distance b.

A smaller value of the distance b means that membrane sinking occurs more difficulty. In particular, for preventing membrane sinking in high-pressure loading operation, the distance b is preferably 2.0 mm or less. On the other hand, a larger value of the distance b means a smaller membrane pressure drop. In consideration of these, the distance b is preferably from 0.1 mm to 2.0 mm, more preferably from 0.2 mm to 0.6 mm.

(Height c of Projections)

The height c of the projections means the height difference between the projection and the sheet surface. As shown in FIG. 4(a), the height c is the difference in the height between the highest part of the projection and the sheet in the cross section vertical to the second direction. Namely, in the height, the thickness of the prat impregnated into the sheet is not taken into consideration.

A larger height c realizes a smaller flow resistance. Accordingly, the height c is preferably 0.01 mm or more. On the other hand, a smaller height c means that the number of the membranes loaded in one element is larger. Accordingly, the height c is preferably 0.6 mm or less, more preferably from 0.1 mm to 0.5 mm.

Figure 5:
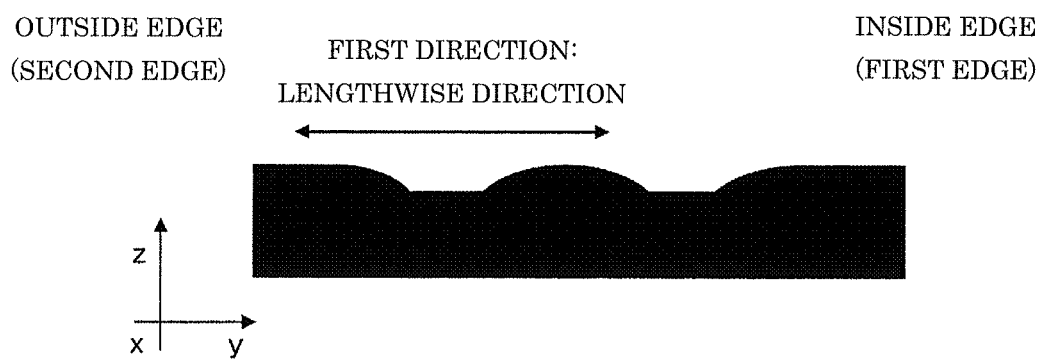
FIG. 5 is a cross-sectional view in the lengthwise direction of the separation membrane of FIG. 2.

FIG. 5 shows a schematic view of a cross section in the lengthwise direction of a separation membrane in which the projections are formed continuously in the second direction. In one projection, (maximum height of projection)/(minimum height of projection) is from 1.10 to 1.50. When the (maximum height of projection)/(minimum height of projection) falls within the range, the contact area between projections and the sheet surface facing the projections lowers in winding up the permeate-side channel member and the winding friction between the projections and the sheet can be reduced. By reducing the friction, stable operation is possible with preventing the projections from peeling or breaking, or deviating. On the other hand, when (maximum height of projection)/(minimum height of projection) exceeds 1.50, the separation membrane may deform in filtration under pressure and the separation membrane may have defects. The ratio of the maximum height of projections to the minimum height of projections is preferably from 1.10 to 1.20.

The projection height may be controlled by varying the resin and the amount constituting projections. In a case where the projections are provided according to a hot melting method, the height may also be controlled by varying the processing temperature and the resin discharge pressure.

The variation coefficient of the projection height is from 0.02 to 0.15. When the variation coefficient of the projection height falls within the range, the winding friction between the projections and the sheet can be reduced and stable operation is possible with preventing the projections from peeling or breaking, or deviating. In addition, the projections can be prevented from deforming during winding of the permeate-side channel member or during storage after the winding. When the variation coefficient of the projection height exceeds 0.15, the separation membrane may be deformed during filtration under pressure and the separation membrane may have defects. The variation coefficient of the projection height is preferably from 0.02 to 0.10.

The variation coefficient of the height c is calculated by measuring the height of the projections in 100 points in one and the same plane of the permeate-side channel member 31. The average value and the standard deviation are calculated, and the ratio of standard deviation/average value is referred to as the variation coefficient of the projection height.

The height difference between the neighboring two projections is preferably smaller. When the height different is large, the separation membrane may deform during filtration under pressure, and the separation membrane may have defects. The height difference between the neighboring two projections is preferably 0.1 mm or less (100 μm or less), more preferably 0.06 mm or less, even more preferably 0.04 mm or less.

For the same reasons, the maximum height difference of all the projections 301 provided in the sheet 302 is preferably 0.25 mm or less, more preferably 0.1 mm or less, even more preferably 0.03 mm or less.

(Width d of Projections)

The width d of the projection 301 is measured as follows. First, in one cross section vertical to the first direction (the widthwise direction of the separation membrane), the average value of the maximum width and the minimum width of one projection 301 is calculated. Specifically, in the projection 301 whose top is thin and bottom is thick as shown in FIG. 4(a), the width of the bottom of the channel member and the width of the top thereof are measured, and the data are averaged to obtain an average value. The average value is calculated in at least 30 cross sections, and the arithmetic average value thereof is calculated to be the width d of the projection in one membrane.

The width d of the projection 301 is preferably 0.2 mm or more, more preferably 0.3 mm or more. When the width d of the projection is 0.2 mm or more, the channel member can keep the shape thereof even when pressure is given to the projections 301 and the sheet 302 in operation of the separation membrane element, and the permeate-side flow channel can be stably formed. The width d of the projection is preferably 2 mm or less, more preferably 1.5 mm or less. When the width d of the projection is 2 mm or less, the permeate-side flow channel can be sufficiently secured.

By broadening the width d of the projection 301 more than the distance b between the projections 301 in the second direction, the pressure to be given to the channel member can be dispersed.

The projections 301 are so formed that the length thereof is larger than the width thereof. Such long projections 301 may be called "wall-like structures".

(Distance e Between Projections in the Lengthwise Direction of Separation Membrane)

The distance e between the projections 301 in the second direction is the shortest distance between the neighboring projections 301 in the second direction (the lengthwise direction of the separation membrane). As shown in FIG. 2, in the case where the projections 301 are continuously arranged from one end to the other end of the separation membrane body 2 in the second direction (in the separation membrane element, from the inside end to the outside end in the winding direction), the distance e between the projections is 0 mm. In the case where the projections 301 are interrupted in the second direction, as shown in FIG. 3, the distance e between the projections is preferably 5 mm or less, more preferably 1 mm or less, even more preferably 0.5 mm or less. When the distance e is controlled to fall within the range, the mechanical load to be given to the membrane may be small even when the membrane sinks, so that the pressure drop owing to flow channel clogging can be made to be relatively small. The lower limit of the distance e is 0 mm.

(Length f of Projection)

The length f of the projection 301 is the length of the projection 301 in the lengthwise direction (namely the second direction) of the separation membrane 2. The length f of the projection may be determined by measuring the length of 30 or more projections 301 in one separation membrane 2 and calculating the average value. The length f of the projection 301 is preferably not more than the length a of the separation membrane. When the length f of the projection 301 is the same as the length a of the separation membrane, it means that the projections 301 are continuously arranged from the inside end to the outside end in the winding direction of the separation membrane 2. The length f of the projection is preferably 10 mm or more, more preferably 20 mm or more. When the length f is 10 mm or more, the flow channel can be secured even under pressure.

(Width g of the Projections 301 (Upper Bottom Side of Projections))

As shown in FIG. 4(a), the width g of the upper bottom of the projection in the cross section vertical to the first direction is measured. The measurement is carried out in at least 30 cross sections, and the arithmetic average of the found data is calculated to be the width g of the projection (the upper bottom side of the projection) in one membrane. The width of the projection (the upper bottom side of the projection) means the width of the projection in the first direction at the position of 90% of the projection height in the cross section vertical to the first direction.

(Distance h Between the Projections 301 in the Widthwise Direction of the Separation Membrane 2 (Upper Bottom Side of Projections))

As shown in FIG. 4(a), in the cross section vertical to the first direction, the distance between the tops of the neighboring two projections 301 is measured. In arbitrary 30 or more cross sections, the distance between the projections 301 is measured and the arithmetic average value is calculated from the found data to be the distance h between the projections 301 in the widthwise direction of the separation membrane 2 (upper bottom side of projections). The distance between the tops of the neighboring two projections 301 means the distance between the tops of the neighboring two projections 301 in the first direction at the position of 90% of the projection height in the cross section vertical to the first direction.

(Cross-Section Area i of One Permeate-Side Flow Channel)

As shown in FIG. 4(b), in the cross section vertical to the first direction, the area surrounded by the neighboring two projections 301 and the sheet is the cross-section area i of one permeate-side flow channel.

(Width m of the Projections 301 (Lower Bottom Side of Projections))

As shown in FIG. 4(a) and FIG. 4(b), in the cross section vertical to the first direction, the width m of the bottom of the projection is measured. In at least 30 cross sections, the width is measured, and the arithmetic average value of the found data is calculated to be the width m of the projections (lower bottom side of projections) in one membrane. The width of the bottom of the projection means the projection width in the first direction at the position of 10% of the projection height in the cross section vertical to the first direction.

(Distance n Between the Projections 301 in the Widthwise Direction of the Separation Membrane 2 (Lower Bottom Side of Projections))

As shown in FIG. 4(a), in the cross section vertical to the first direction, the distance between the bottoms of the neighboring two projections 301 is measured. In arbitrary 30 or more cross sections, the distance between the projections 301 is measured and the arithmetic average value is calculated from the found data to be the distance n between the projections 301 in the widthwise direction of the separation membrane 2 (lower bottom side of projections). The distance between the bottoms of the neighboring two projections 301 means the distance between the bottoms of the neighboring two projections 301 in the first direction at the position of 10% of the projection height in the cross section vertical to the first direction.

(Shape of Projections)

As the shape of the projection 301, one capable of reducing the flow resistance in the flow channel and capable of stabilizing the flow channel in fluid passing therethrough may be selected. From these viewpoints, in any cross section vertical to the plane direction of the separation membrane, the shape of the projection 301 may be semicircular, trapezoidal, straight columnar or curved columnar or may also be a combination of such shapes. Preferably, the shape is semicircular or oval. In particular it is more preferable that the oblateness of the cross section of the projections is from 0.1 to 0.8. When the oblateness of the cross section of the projections falls within the range to be semicircular or oval, the contact area between the projections and the sheet surface facing the projections is decreased in winding the permeate-side channel member so that the winding friction between the projections and the sheet surface can be reduced and stable operation may be possible with preventing peeling, breakage or deviation of the projections. On the other hand, when the oblateness is smaller than 0.1, membrane sinking is likely to occur in filtration under pressure, and when the oblateness is more than 0.8, the permeate-side flow channel may reduce and the fresh water production rate in the element may lower. The oblateness may be calculated by observing the cross section of the separation membrane having projections with a scanning electronic microscope, a transmission electronic microscope or an atomic force microscope, and measuring the projection width and the projection height.

Oblateness=[(width $m$ of projection 301(lower bottom side of projection))–height $c$ of projection)]/(width $m$ of projection 301(lower bottom side of projection))

It is desirable that, among the plurality of sheets existing between the permeate-side faces of the neighboring separation membrane leaves, when the sheet having projections fixed thereto is so arranged that the sheet-side face is kept in contact with the permeate-side face of the separation membrane, the projections are preferably semicircular or trapezoidal such that the width m of the projections (lower bottom side of projections) in the projection cross section is larger than the width g of the projections (upper bottom side of projections). Having such a configuration, the separation membrane can be prevented from sinking without reducing the volume i of the permeate-side flow channel, and therefore both high initial performance and pressure resistance can be satisfied.

When two or more of the plurality of sheets existing between the permeate-side faces of neighboring separation membrane leaves have projections fixed thereto, it is preferable that the angle to be formed by the projection positioned on the side of the separation membrane 303A1 and the adjacent projection positioned on the side of the separation membrane 303B1 is from 1° to 30°. When the angle falls within the range, the separation membrane can be prevented from sinking without reducing the volume i of the permeate-side flow channel, and therefore both high initial performance and pressure resistance can be satisfied. In addition, the projections positioned on the side of the separation membrane 303A1 and the projections positioned on the side of the separation membrane 303B1 may be deviated in the x-axial direction. However, it is preferable that the volume i of the permeate-side flow channel is not 0 (zero).

The projections 301 may be formed of a thermoplastic resin. When the projection 301 are formed of a thermoplastic resin, the shape of the channel member may be freely designed so as to satisfy the necessary separation characteristics and the permeation performance conditions by varying the processing temperature and the type of the thermoplastic resin to be selected.

The shape of the projections 301 in the plane direction of the separation membrane may be linear as a whole, as shown in FIG. 2 and FIG. 3, or may be any other shape, for example, a curved shape, a saw-toothed shape or a waved shape. In those shapes, the projections 301 may be aligned in a dashed line or a dotted line. From the viewpoint of reducing the flow resistance, a dot line or a dashed line is preferred, however, the channel member is interrupted and therefore the membrane sinking may occur frequently during filtration under pressure. Accordingly, the shape may be suitably determined in accordance with the intended use.

In a case where the shape of the projection 301 in the plane direction of the sheet 302 is linear, the neighboring channel members may be placed in nearly parallel with each other. The expression of "placed in nearly parallel" is intended to include e.g. cases where adjacent channel members are disposed on the separation membrane so as not to cross each other, and cases where an angle between extended lines of adjacent channel members is from 0° to 30°, the angle is from 0° to 15°, and the angle is from 0° to 5°.

The angle between the longitudinal direction of the projection 301 and the longitudinal direction of the water collection tube is preferably from 60° to 120°, more preferably from 75° to 105°, even more preferably from 85° to 95°. When the angle between the longitudinal direction of the channel member and the longitudinal direction of the water collection tube falls within the range, permeate can be efficiently collected in the water collection tube.

For the purpose of forming the flow channel with stability, it is appropriate that the separation membrane main body is inhibited from sinking when the separation membrane main body is pressurized in a separation membrane element. For inhibition of the membrane sinking, it is appropriate that the contact area of the separation membrane main body with the channel members is large, or equivalently, the total area of channel members is large with respect to the area of the separation membrane main body (the total projected area of channel members is large with respect to the membrane face of the separation membrane). On the other hand, for the purpose of reducing pressure drop, it is appropriate that the cross-sectional area of the flow channel is large. When a cross section of the flow channel is concerned, it is appropriate that the cross-sectional shape of the flow channel is the shape like a concave lens in order to ensure a large cross-sectional area of the flow channel while ensuring a large contact area of the separation membrane main body with each channel member in the direction vertical to the lengthwise direction of the flow channel. In addition, each projection 301 may be a rectangular shape with no change in the width thereof in cross-sectional shape in the direction vertical to the winding direction. On the other hand, within a range not having an negative influence on the separation membrane performance, the cross-sectional shape of the projection 301 in the direction vertical to the winding direction may be a shape varying in width, including cross-sectional shapes of a trapezoidal wall-like shape, an elliptic column, an elliptic cone, a quadrangular pyramid and a hemisphere.

The shape of the projection 301 should not be construed as being limited to those shown in FIGS. 3 to 7. When the channel members are provided by solidifying a molten material to the sheet 302 in accordance with e.g. a hot-melt technique, the shape of the projection 301 can be adjusted freely to satisfy the required conditions concerning separation characteristics and permeation performance by making changes to the treatment temperature and the kind of hot-melt resin to choose.

In FIG. 2, the plane shape of each projection 301 is linear in the lengthwise direction. However, so long as each projection 301 is in a state of projecting from the surface of the separation membrane main body 2, and moreover the plane shape thereof does not contribute to impairment of effects intended as a separation membrane element, the linear shape can be changed to another shape. Specifically, the shape of each channel member (projection) in the plane direction may be a curved line shape, a wavy line shape or the like. In addition, a plurality of channel members (projections) incorporated in one sheet of separation membrane may be formed so as to differ in at least either width or length from each other.

(Projected Area Ratio)

From the viewpoint of reducing flow resistance in the permeate-side flow channel in particular and forming the flow channel with stability, it is appropriate that the projected area ratio of the projection 301 to the area of the permeate-side face of the separation membrane is from 0.03 to 0.90, more preferably from 0.15 to 0.90, further preferably from 0.20 to 0.75, and still more preferably from 0.30 to 0.80. The term "projected area ratio" refers to the value obtained by cutting a piece measuring 5 cm by 5 cm from the separation membrane and the permeate-side channel member, determining the projected area of the channel members through projection of the permeate-side channel member onto the plane parallel to the plane direction of the separation membrane, and then dividing the projected area by the cut area (25 cm$^2$).

(Absent Ratio)

As shown in FIG. 8($a$) and FIG. 8($b$), water having passed through the separation membranes 2 and 7 runs through the permeate-side flow channel 5 and is collected in the water collection tube 6. In the separation membranes 2 and 7, water having passed through the region distant from the water collection tube 6, that is, the region close to the outside edge in the winding direction (the region close to the right-side edge in FIG. 8($a$)) joins together with water having passed through the region more inside in the winding direction, while flowing toward the water collection tube 6, and thus further flows toward the water collection tube 6. Accordingly, in the permeate-side flow channel 5, the water amount is smaller in the region distant from the water collection tube 6.

Consequently, in the region close to the outside edge in the winding direction, even though a permeate-side channel member does not exist and therefore the flow resistance in the region is high, the fresh water production rate in the entire separation membrane element is thereby influenced little. For the same reason, in the region close to the outside edge in the winding direction, even though the channel member formation accuracy is low and the resin to form the channel member is continuously applied in the first direction (the widthwise direction of the separation membrane), the fresh water production rate in the separation membrane element is also thereby influenced little. The same shall apply to the case where the resin to form the channel member is applied continuously with no interruption in the plane direction of the separation membrane (x-y plane) in this region.

Accordingly, as shown in FIG. 9, the proportion of the distance from the outside edge in the winding direction of the permeate-side channel member to the outside edge in the winding direction of the projection 301, namely, the length L3 in the second direction (the lengthwise direction of the separation membrane) of the region R3, which is the region provided at the outside edge in the winding direction of separation membrane 2, or the region where a permeate-side flow channel is not formed, relative to the length L1 in the second direction of the permeate-side channel member (corresponding to the above-mentioned "a") is preferably from 0% to 30%, more preferably from 0% to 10%, even more preferably from 0% to 3%. This proportion is referred to as an absent ratio. The region R2 is a region where a permeate-side flow channel is formed.

The absent ratio is expressed as (L3/L1)×100 with reference to FIG. 9. In FIG. 9, for convenience of explanation, an embodiment where the region R3 does not have a projection 301 is shown. However, the region R3 may also be a region where continuous projections are provided in the widthwise direction.

FIG. 9 is a cross-sectional view where the outside edge in the winding direction of a permeate-side channel member is cut in the lengthwise direction of the projection 301. In FIG. 9, the projection 301 is fixed to the sheet 302, and extends just before the outside edge in the winding direction of the permeate-side channel member. In FIG. 9, for convenience of explanation, an embodiment where the projection 301 is provided continuously in the lengthwise direction is shown, but as already described above, the above-mentioned various configurations may apply to the projection 301.

In FIG. 9, the region where the permeate-side channel member is provided is expressed by R2, and the region where the projection 301 (permeate-side channel member) is not provided is expressed by R3. The length in the MD direction of the separation membrane 2 is expressed by L1, the length in the MD direction of the projection 301 (that is, the length of the region R2) is expressed by L2, and the length in the MD direction of the region R3 where the projection 301 does not exist is expressed by L3. Here, the MD direction means the lengthwise direction of the separation membrane and the winding direction of the separation membrane.

[3. Separation Membrane Element]

(3-1) Outline

As shown in FIG. 8(a) and FIG. 8(b), the separation membrane element 100 includes the water collection tube 6 and the separation membrane leaves 4 having any of the above-mentioned configuration and being wound around the water collection tube 6.

(3-2) Separation Membrane

<Outline>

As shown in FIG. 8(a), the separation membrane 2 and the permeate-side channel member 31 are wound around the water collection tube 6 in such a manner that the widthwise direction of the separation membrane 2 and the permeate-side channel member 31 runs along the longitudinal direction of the water collection tube 6. As a result, the separation membrane 2 and the permeate-side channel member 31 are so arranged that the lengthwise direction thereof runs along the winding direction.

Consequently, as shown in FIG. 8(a), the projections 301 constituting the permeate-side channel member are arranged discontinuously at least relative to the longitudinal direction of the water collection tube 6. Namely, the permeate-side flow channel 5 is so formed as to continue from the outside edge to the inside edge of the separation membrane in the winding direction. As a result, permeate may readily reach the water collection tube 6 positioned in the center, that is, the flow resistance is small, and therefore a large fresh water production rate can be realized.

"Inside in the winding direction" and "outside in the winding direction" are a shown in FIG. 8(a). Namely, "inside edge in the winding direction" and "outside edge in the winding direction" correspond to the edge closer to, and the edge distant from the water collection tube 6, respectively, in the separation membrane 2.

<Separation Membrane Leaf and Envelope-Shaped Membrane>

The separation membranes form a separation membrane leaf (in the present invention, this may be simply referred to as "leaf"). In the separation membrane leaf, the separation membranes are so arranged that the feed-side face of one membrane faces the feed-side face of the other separation membrane with a feed-side channel member sandwiched therebetween. In the separation membrane leaf, a feed-side flow channel is formed between the feed-side faces of the separation membranes facing each other.

Further, two separation membrane leaves are stacked so that the permeate-side face of the separation membrane of one leaf faces the permeate-side face of the separation membrane of the other separation membrane leaf, and thus the separation membrane leaves form an envelope-shaped membrane. The envelop-shaped membrane is a pair of separation membranes which are so arranged that the permeate-side faces thereof face each other (for example, a pair of separation membranes 2b and 2c shown in FIG. 1). The envelope-shaped membrane is rectangular in shape, and among gaps between the permeate-side faces, only the gap at one edge on the inner side of the rectangular separation membrane in the winding direction is left open and the gaps at the three other edges are sealed so that permeate flows into the water collection tube. Permeate is isolated from raw water by this envelope-shaped membrane.

Examples of a mode of sealing include an adhesion mode using an adhesive, a hot-melt technique or the like, a fusion mode using heating, laser light or the like, and a mode of inserting a rubber sheet into a gap. The sealing carried out in an adhesion mode is especially preferred because it is most convenient and produces high effect.

As to the feed-side face of the separation membrane, the inner-side end in the winding direction is closed by folding or sealing. By sealing the feed-side face of the separation membrane, not folding, the end of the separation membrane is hardly deformed. By inhibiting occurrence of deformation in the neighborhood of a fold line, gaps are prevented from appearing between separation membranes at the time of winding, and leakage from the gaps due to the gaps are prevented from occurring.

Since leakage can be prevented in that manner, the yield ratio of the envelope-shaped membranes is increased. The yield ratio of the envelope-shaped membranes may be determined as follows. Specifically, an air leak test of a separation membrane element is carried out in water, and the number of the envelope-shaped membranes through which leakage has occurred is counted. Based on the count, the ratio of (number of enveloped-shaped membranes with leakage/number of enveloped-shaped membranes subjected to the test) is calculated as the yield ratio of the envelope-shaped membranes.

A specific air leak test method is described as follows. The end of the water collection tube of a separation membrane element is sealed, and air is introduced from the other end. The introduced air runs through the hole of the water collection tube and reaches the permeate side of the separation membrane. When the separation membrane has been insufficiently folded and has warped around the folded part to form gaps, air may run through the gaps. As a result, air moves toward the feed side of the separation membrane and air may reach in water from the end (feed side) of the separation membrane element. In that manner, air leak can be confirmed as generation of bubbles.

In a case where the separation membrane leaf is formed by folding, a longer time is taken to fold the separation membrane when the leaves are longer (namely, when the original separation membranes are longer). However, by sealing the feed-side face of the separation membrane without folding, the production time may be prevented from being prolonged even when the leaves are long.

In the separation membrane leaf and the enveloped-shaped membrane, the separation membranes facing each other (separation membranes 2b and 2c in FIG. 1) may have the same constitution, or they may differ in constitution from each other. More specifically, it is essential in a separation membrane element only that permeate-side channel members are provided to at least one of two sheets of separation membranes facing each other, and hence separation membranes having permeate-side channel members and those having no permeate-side channel member may be stacked in alternation. For convenience of explanation, however, the term "separation membrane" used in explanations of the separation membrane element and matters related thereto is intended to also include separation membranes having no permeate-side channel member (e.g. a membrane having the same constitution as a separation membrane).

Separation membranes facing each other at their individual permeate-side faces or feed-side faces may be two sheets of separation membranes different from each other, or they may be one sheet of separation membrane folded in two.

(3-3) Permeate-Side Flow Channel

As described above, the permeate-side channel member is arranged between the permeate-side faces of neighboring two membranes. By the projections 301, a permeate-side flow channel is formed inside the enveloped-shaped membrane, namely between the permeate-side faces of the separation membranes facing each other.

(3-4) Feed-Side Flow Channel (Channel Member)

The separation membrane element 100 has, between the feed-side faces of separation membranes facing each other, channel members (not shown in the figure) which are higher than 0 and lower than 1 in projected area ratio thereof to the area of the separation membrane 2. It is appropriate that the projected area ratio of the feed-side channel member is from 0.03 to 0.50, further preferably from 0.10 to 0.40, particularly preferably from 0.15 to 0.35. When the projected area ratio is in a range of 0.03 to 0.50, flow resistance can be reduced to a relatively small value. The projected area ratio as used herein refers to the value obtained by cutting a piece measuring 5 cm by 5 cm from the separation membrane and feed-side channel members, determining the total projected area of the feed-side channel members through the projection onto the plane parallel to the plane direction of the separation membrane, and then dividing the total projected area by the cut area.

The height of the feed-side channel member is, as described below, preferably more than 0.5 mm and 2.0 mm or less, more preferably from 0.6 mm to 1.0 mm, in consideration of the performance balance and the operation cost.

Regarding the shape the feed-side channel member, the feed-side channel member may have a continuous shape or a discontinuous shape. The channel member having a continuous shape may be a member referred to as film or net. The term "continuous shape" used herein means that the channel member is continuous throughout its dimensions in a substantial sense. When this continuous shape is concerned, however, discontinuities may be included in part of the channel member to an extent of not causing problems such as reduction in amount of fresh water produced. The definition of "discontinuous" is as described hereinabove for the permeate-side channel member. The material for the feed-side channel member may be the same as or different from the material for the separation membrane.

(Working into Uneven Configuration)

In place of arranging the feed-side channel member in the feed-side face of the separation membrane, the feed-side face of the separation membrane may be given a height difference according to a method of emboss forming, hydraulic forming or calendering.

Examples of the embossing method include roll embossing. The pressure and the processing temperature for the roll embossing may be suitably determined in accordance with the melting point of the separation membrane. For example, in a case where the separation membrane has a porous supporting layer including an epoxy resin, the linear pressure is preferably from 10 kg/cm to 60 kg/cm, and the heating temperature is preferably from 40° C. to 150° C. In a case of having a porous supporting layer containing a heat-resistant resin such as polysulfone, the linear pressure is preferably from 10 kg/cm to 70 kg/cm, and the roll heating temperature is preferably from 70° C. to 160° C. In roll embossing, the winding speed is preferably from 1 m/min to 20 m/min in any case.

In embossing, it is important that the embossing pattern is so configured that the flow resistance through the flow channel is reduced and the flow channel in feeding a fluid to the separation membrane element to permeate therethrough can be stabilized. From these viewpoints, the embossing configuration as observed from the top of the surface thereof include oval, circular, ellipsoidal, trapezoidal, triangular, rectangular, square, parallelogrammic, diamond-shaped and infinite forms, and in a three-dimensional view, those formed by three-dimensionally forming the shape seen from the top of the surface, as it is in the surface direction thereof, those formed by expanding the shape, or those formed by narrowing the shape are employable.

The height difference in the feed-side face of the separation membrane to be given by embossing may be freely controlled by varying the pressure heat treatment condition so that the separation characteristics and the water permeation performance can satisfy the required conditions. However, when the height difference in the feed-side face of the separation membrane is too large, the number of the membrane leaves capable of being loaded in the vessel for the element to be produced may reduce, though the flow resistance is small. When the height difference is small, the flow resistance through the flow channel may increase and the separation characteristics and the water permeation performance may worsen. As a result, the fresh water production performance of the element lowers and the operation cost for increasing the fresh water production rate increases.

Accordingly, in consideration of the balance of the above-mentioned performance and the operation cost, in the separation membrane, the height difference in the feed-side face of the separation membrane is preferably more than 0.5 mm and 2.0 mm or less, more preferably from 0.6 mm to 1.0 mm. The height difference in the feed-side face of the separation membrane may be determined according to the same method as that for the height difference of the permeate-side face of the separation membrane mentioned above.

The groove width is preferably from 0.2 mm to 10 mm, more preferably from 0.5 mm to 3 mm. Preferably, the pitch is suitably designed to fall within a range of from $\frac{1}{10}$ to 50 times the groove width. The groove width indicates the sunk site on the surface having a height difference, and the pitch indicates the horizontal distance from the highest part in a high portion of the surface having a height difference to the highest part in another high portion adjacent to the former high portion.

The projected area ratio of the hill parts formed by embossing is, for the same reason as that for the feed-side channel member, preferably from 0.03 to 0.5, more preferably from 0.10 to 0.40, even more preferably from 0.15 to 0.35.

The "height difference" in the face of the separation membrane is the height difference between the surface of the separation membrane main body and the tip of the channel member (namely, the height of the channel member), and in the case where the separation membrane main body is worked to have unevenness, the height difference is the difference in height between the hill part and the valley part of the unevenness.

(3-5) Water Collection Tube

The water collection tube 6 is configured to allow passage of permeate therethrough, and materials, shape and size thereof are not particularly limited. As the water collection tube 6, for example, a cylindrical member having a side plane with a plurality of holes may be used.

[4. Method for Producing Separation Membrane Element]

A method for producing the separation membrane element includes a step of producing a separation membrane. The step for producing a separation membrane includes at least the following steps:

a step of preparing a separation membrane main body including a substrate and a separation functional layer;

a step of softening a material having a composition differing from that of the above-mentioned separation membrane main body by heating;

a step of arranging the softened material on the substrate-side face of the separation membrane main body to form a permeate-side channel member; and a step of solidifying the above-mentioned material, thereby fixing the permeate-side channel member to the separation membrane main body.

The steps in the separation membrane element production method are described below.

(4-1) Production of Separation Membrane

As described above, the separation membrane production method may be summarized in brief as follows.

A resin solution prepared by dissolving a resin in a good solvent is cast onto a substrate and immersed in pure water to form a porous supporting layer, whereby the porous supporting layer and the substrate are combined. Thereafter, as mentioned above, a separation functional layer is formed on the porous supporting layer. In order to enhance separation performance and permeation performance, chemical treatment using chlorine, acid, alkali, nitrous acid or the like is further carried out as required, and besides, monomers are washed out. Thus a continuous sheet of separation membrane main body is produced.

Additionally, before or after the chemical treatment, an unevenness pattern may be formed on the separation membrane main body by embossing or the like.

(4-2) Configuration of Permeate-Side Channel Member

The method for producing the separation membrane includes a step of providing discontinuous channel members on the permeate-side face of the separation membrane. This step may be carried out at any stage of separation membrane production. For example, channel members may be provided before formation of the porous supporting layer on the substrate, or they may be provided after formation of the porous supporting layer and before formation of the separation functional layer. On the other hand, the channel members may be provided after formation of the separation functional layer, and before or after the foregoing chemical treatment.

Examples of a method for configuring channel members include a step of arranging a soft material on the separation membrane, and a step of curing it. Specifically, for arranging the channel members, a UV-curable resin, chemical polymerization, hot melting, drying and the like may be used. In particular, hot melting is preferably used. Specifically, the method includes a step of softening a material such as a resin or the like by heat (namely, hot melting the material), a step of arranging the softened material on the separation membrane, and a step of cooling and curing the material to be fixed on the separation membrane.

Examples of the method for configuring channel members include a coating method, a printing method and a spraying method. And examples of an apparatus used in such a method include a nozzle-type hot melt applicator, a spray-type hot melt applicator, a flat nozzle-type hot melt applicator, a roll coater, an extrusion coater, a gravure printer and a sprayer.

(4-3) Formation of Feed-Side Flow Channel

In a case where the feed-side channel members are discontinuous members formed of a material differing from that of the separation membrane, the same method and the timing as that in forming the permeate-side channel members may apply to the formation of the feed-side channel members.

According to a method of embossing, hydraulic forming, calendering or the like, a height difference may be imparted to the feed side of the separation membrane. An example of the embossing method is a roll embossing method. The pressure and the processing temperature in carrying out the roll embossing method may be suitably determined in accordance with the melting point of the separation membrane.

For example, in a case where the separation membrane has a porous supporting layer containing an epoxy resin, the linear pressure is preferably from 10 kg/cm to 60 kg/cm, and the heating temperature is preferably from 40° C. to 150° C. In a case where the separation membrane has a porous supporting layer containing a heat-resistant resin such as a polysulfone, the linear pressure is preferably from 10 kg/cm to 70 kg/cm, and the roll heating temperature is preferably from 70° C. to 160° C. In any case of the roll embossing method, the winding speed is preferably from 1 m/min to 20 m/min.

In embossing, it is important that the embossing pattern is so configured that the flow resistance through the flow channel is reduced and the flow channel in feeding a fluid to the separation membrane element to permeate therethrough can be stabilized. From these viewpoints, the embossing configuration as observed from the top of the surface thereof include oval, circular, ellipsoidal, trapezoidal, triangular, rectangular, square, parallelogrammic, diamond-shaped and infinite forms. In a three-dimensional view, the embossing configuration may be so formed that the higher part thereof may have a smaller width, or on the contrary, may be so formed that the higher part thereof may have a larger width, or may be so formed as to have the same width irrespective of the height.

The height difference in the feed-side face of the separation membrane to be given by embossing may be freely controlled by varying the pressure heat treatment condition so that the separation characteristics and the water permeation performance can satisfy the required conditions.

As described above, in the case where the formation of the feed-side flow channel is attained by fixing the feed-side channel member to the separation membrane, or by working the membrane to have unevenness, it may be considered that the feed-side flow channel formation step is one step in the separation membrane production method.

In a case where the feed-side flow channel is a continuously formed member such as net or the like, a separation membrane may be produced by arranging the permeate-side channel member on a separation membrane main body and then the resultant separation membrane and the feed-side channel member may be stacked on each other.

(4-4) Formation of Separation Membrane Leaf

As mentioned above, the separation membrane leaf may be formed by folding a separation membrane in such a manner that the feed-side face thereof faces inward, or may be formed by combining separate two separation membranes in such a manner that the feed-side faces thereof face each other.

Preferably, the separation membrane element production method includes a step of sealing the inside edges in the winding direction of the separation membrane at the feed-side face thereof. In the sealing step, two separation membranes are stacked on each other in such a manner that the feed-side faces of the two separation membranes face each other. Further, the inside edges in the winding direction of the stacked separation membranes, that is, the left-side edges in FIG. 8(a) are sealed.

Examples of the "sealing" method include a method of adhesion with an adhesive or by hot melting, a method of fusion by heating or laser, and a method of inserting a rubber sheet. The sealing by adhesion is especially preferred since it is most simple and effective.

In this, a feed-side channel member prepared separately from the separation membrane may be arranged inside the stacked separation membranes. As described above, by previously providing a height difference on the feed-side face of the separation membrane by embossing or resin coating, arrangement of the feed-side channel member may be omitted.

Any of sealing on the feed-side face or sealing on the permeate-side face (for formation of envelope-shaped membrane) may be carried out first, or sealing on the feed-side face and sealing on the permeate-side face may be carried out in parallel with each other while a separation membrane is put thereover. However, for preventing the separation membrane from being wrinkled in winding, it is desirable that solidification of the adhesive or hot-melt adhesive at the edges in the widthwise direction, that is, solidification for forming the envelope-shaped membrane is finished after winding so that deviation in the lengthwise direction of the neighboring separation membranes by winding could be allowed.

(4-5) Formation of Envelope-Shaped Membrane

An envelope-shaped membrane can be formed by folding one separation membrane with the permeate-side face thereof kept facing inward and adhering it, or by stacking two separation membranes with the permeate-side faces thereof kept facing inward and adhering them. In a rectangular envelope-shaped membrane, three edges are sealed so that only one edge in the lengthwise direction is opened. The sealing can be carried out by adhesion with an adhesive or a hot-melting adhesive, or by fusion by heat or laser.

The viscosity of the adhesive for use in forming the envelope-shaped membrane is preferably within a range of from 40 P (poise) to 150 P, more preferably from 50 P to 120 P. When the viscosity of the adhesive is too high, the element may be wrinkled when the stacked leaves are wound around the water collection tube. The wrinkling may detract from the performance of the separation membrane element. On the contrary, when the viscosity of the adhesive is too low, the adhesive may bleed out from the edges of the leaves to contaminate devices. In addition, when the adhesive adheres to any other part than a part to which the adhesive is to be applied, the performance of the separation membrane element may degrade and the working efficiency may greatly lower owing to the operation for treating the runoff adhesive.

The amount of the adhesive to be applied is preferably such that, after leaves have been wound around a water collection tube, the width of the part to which the adhesive is applied is from 10 mm to 100 mm. Accordingly, the separation membranes can be surely adhered and inflow of raw water into the permeate side can be prevented, and in addition, the effective membrane area of the separation membrane element can be relatively largely secured.

As the adhesive, a urethane adhesive is preferably used. In order to set the viscosity of the urethane adhesive to the range of from 40 P to 150 P, preferably, the main ingredient of isocyanate and the curing agent of polyol are mixed in a ratio by weight of isocyanate/polyol being from 1/5 to 1. Regarding the viscosity of the adhesive, the viscosity of a mixture previously defined in point of the single main ingredient, the single curing agent and the blending ratio of the two is measured with a B-type viscometer (ISO15605: 2000).

(4-6) Winding of Separation Membrane

In the producing the separation membrane element, any of traditional element producing systems can be used. And as a method for producing the element, any of the methods described in references (e.g. JP-B-44-14216, JP-B-4-11928 and JP-A-11-226366) can be adopted. Details on them are as follows.

When a separation membrane is wound around a water collection tube, the separation membrane is so arranged that the leaves-closed edge, that is, the closed part of the envelope-shaped membrane faces the water collection tube. By winding the separation membrane around the water collection tube in such a configuration, the separation membrane is spirally wound.

When a spacer such as tricot or a substrate is wound around the water collection tube, the adhesive applied to the water collection tube in winding the element hardly flows to prevent leakage and further the flow channel around the water collection tube can be stably secured. Preferably, the spacer is wound longer than the circumference of the water collection tube.

(4-7) Other Steps

The separation membrane element production method may further includes a step of additionally winding film, filaments or the like around the outside of the wound body of the separation membrane in the manner as described above, and additional other steps, such as a step of cutting the edges of the separation membrane in the lengthwise direction of the water collection tube and evening up them and a step of attaching end plates.

[5. Use of Separation Membrane Element]

Separation membrane elements may be used as a separation membrane module by being connected in series or in parallel and loaded in a pressure vessel.

In addition, the separation membrane element and the separation membrane module can be configured as a fluid separation apparatus by being combined with a pump for feeding a fluid into them and a fluid pre-treating unit. By using such a fluid separation apparatus, raw water is separated e.g. into permeate like drinkable water and concentrate not having passed through the membrane, whereby water meeting the intended purpose can be obtained.

The higher the pressure during operation of the fluid separation apparatus, the more improvement in removal efficiency is achieved, but the more energy is required for the operation. With consideration given to this point and further to maintenance capabilities of feed flow channel and permeate flow channel of the separation membrane element, it is appropriate that the operation pressure at the time of permeation of water to be treated through the separation membrane module is from 0.5 MPa to 10 MPa. Although the salt removal ratio decreases with increase in the raw water temperature, as the feed water temperature decreases, so does the membrane permeation flux. It is therefore appropriate that the raw water temperature is from 5° C. to 45° C. In addition, as long as raw water has a pH in a neutral region, deposition of magnesium scale or the like and membrane degradation are inhibited from occurring even when the raw water is a liquid having a high salt concentration such as seawater.

Regarding the fluid to be treated with the separation membrane element, when the separation membrane element is used in water treatment, raw water capable of being fed into the element is e.g. a liquid mixture containing 500 mg/L to 100 g/L of TDS (Total Dissolved Solids), such as seawater, brackish water and waste water. In general, TDS represents a total dissolved solids amount, and is expressed in "mass/volume", but considering 1 L as 1 kg, it may be expressed in "mass ratio". According to the definition thereof, TDS can be calculated from the mass of the matter remaining after evaporation of a solution filtered through a 0.45-μm filter at a temperature of 39.5° C. to 40.5° C., but more conveniently it can be converted from practical salinity (S).

EXAMPLES

The separation membrane element according to aspects of the present invention is illustrated below in more detail by reference to the following Examples. However, the present invention should not be construed as being limited to these Examples.

(Projection Height)

Using a high-precision configuration analysis system "KS-1100" (trade name) manufactured by KEYENCE CORPORATION, 100 sites having a height difference of 10 μm or more were analyzed.

The variation coefficient of the projection height was determined as follows. The projection height was measured on 100 sites in one and the same plane in the permeate-side channel members, and the average value of the found data and the standard deviation were calculated. The value of standard deviation/average value is referred to as the variation coefficient of the projection height.

(Stability of Wound Body)

The separation membrane having permeate-side channel members fixed thereto was wound at an unwinding tension of 50 N and a winding tension of 50 N in a length of 100 m, and stored at room temperature for 100 days. Subsequently, the separation membrane was unwound and the height change in the permeate-side channel members in the separation membrane facing the permeate-side channel members was measured.

(Height change in permeate-side channel members)=(average height of permeate-side channel members in separation membrane having been wound, then stored and unwound)/(average height of permeate-side channel members in separation membrane before winding)

(Peelability of Projections)

In the separation membrane element whose performance was evaluated, the separation membrane was unwound, and checked for peeling of the permeate-side channel member from the separation membrane. 100 sites on the permeate-side channel member were observed using a microscope "VHX-1000" (trade name) manufactured by KEYENCE CORPORATION. The number of the sites where the permeate-side channel member was peeled by 0.1 mm or more from the separation membrane was counted.

(Tensile Strength and Tensile Elongation of Sheet)

Based on ISO9073-3:1989, a sample of 5 cm×30 cm was tested with a Tensilon universal material tester "RTF-2430" (trade name, manufactured by A & D Company). Under the condition of a chuck distance of 20 cm and a tension rate of 10 cm/min, the sample was measured at 5 points both in the longitudinal direction and the cross direction, and on the resultant strength elongation curve, the data were read. The value was calculated by rounding off the resultant value to the first decimal place.

(Impregnation Ratio of Projections)

The permeate-side channel member was cut along with the projections in the depth direction, and the cross section was observed with a scanning electronic microscope "S-800" (trade name, manufactured by Hitachi Limited). Arbitrary 30 impregnation sites were photographed at a magnification of 100 times. On the resultant photographic picture, the maximum impregnation thickness and the sheet thickness were measured, and the impregnation ratio was calculated on the basis of the following formula:

Impregnation Ratio (%)=(maximum impregnation thickness of projections in sheet/sheet thickness)×100.

From the above, the average value per one impregnation site was calculated. The resultant average value is expressed as "impregnation ratio".

(Sheet Thickness)

Using a high-precision configuration analysis system "KS-1100" (trade name) manufactured by KEYENCE CORPORATION, the average height difference was analyzed from the measurement results on the permeate side of 5 cm×5 cm. 40 sites having a height difference of 10 μM or more were analyzed, and the sum total of the found height data was divided by the total measurement sites.

(Maneuvering Test)

Seawater adjusted at a temperature of 25° C. and a pH of 6.5 (TDS concentration about 3.5%, boron concentration about 5 ppm) was applied to the produced separation membrane element to pass therethrough under an operation pressure of 6.5 MPa for 1 minute×2000 times.

(Fresh Water Production Rate)

To the separation membrane element that had been tested in the maneuvering test, seawater adjusted at a temperature of 25° C. and a pH of 6.5 (TDS concentration about 3.5%, boron concentration about 5 ppm) was introduced under an operation pressure of 5.5 MPa for membrane filtration treatment for 24 hours, and then after sampling for 30 minutes, the water permeation rate (cubic meter) per day was expressed as the fresh water production rate (m³/day).

(Desalination Ratio (TDS Removal Ratio))

The raw water used in operation for 10 minutes for measurement of the fresh water production rate and the sampled permeate were analyzed for measurement of the conductivity to obtain the TDS concentration. From the following formula, the TDS removal ratio was calculated.

TDS removal ratio (%)=100×{1−(TDS concentration in permeate/TDS concentration in feed water)}

(Membrane Sinking Amount)

Figure 7:
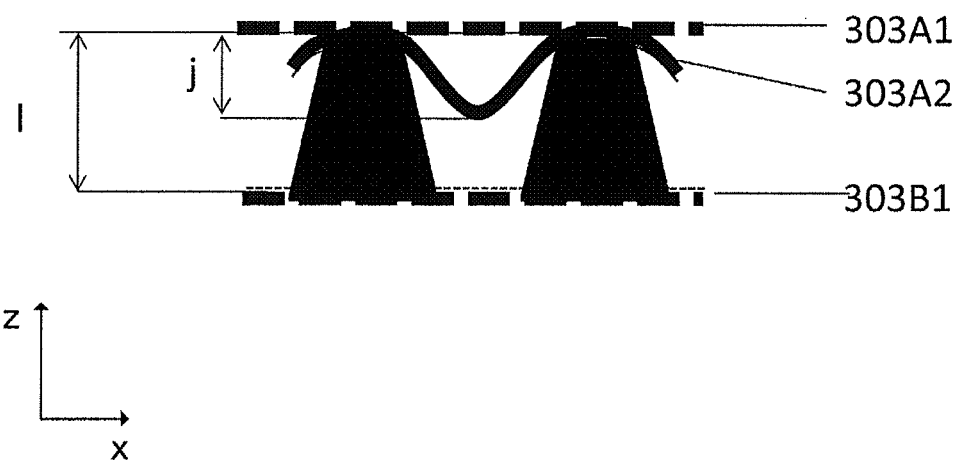
FIG. 7 is a cross-sectional view showing an embodiment of a separation membrane having a permeate-side channel member, and is a schematic view after a maneuvering test of a separation membrane element.

The separation membrane element tested in the maneuvering test was cut in the direction vertical to the separation membrane leaf face and parallel to the widthwise direction of the leaf face, and using a microscope "VHX-1000" (trade name) manufactured by KEYENCE CORPORATION, the cross section was observed. As shown in FIG. 7, the membrane sinking depth $j$ (µm) indicates the maximum distance $j$ at the position in the z direction of the separation membrane between neighboring projections. The sinking depth on the side of the separation membrane 303A1 and the sinking depth on the side of the separation membrane 303B1 were measured each in 50 sites, and the found data were summed up. The resultant value was divided by the number of the measured sites to obtain an average value. In addition, the distance $l$ between the separation membranes 303A1 and 303B1 was measured at 100 sites, and the found data were summed up. The resultant value was divided by the number of the measured sites to obtain an average value. The membrane sinking amount was calculated according to the following formula.

Membrane Sinking Amount (%)=(membrane sinking depth $j$(µm))/(distance $l$ between the permeate-side faces(µm))/×100

Example 1

On a nonwoven fabric (polyethylene terephthalate, single fiber fineness: 1 decitex, thickness: about 0.08 mm, unit weight 1.0 g/cm²), a DMF solution of 16.0 mass % polysulfone was cast to be in a thickness of 200 µm at room temperature (25° C.), and immediately this was immersed in pure water, left therein for 5 minutes, and then immersed in hot water at 80° C. for 1 minute to obtain a porous supporting layer of a fiber-reinforced polysulfone supporting membrane having a thickness of 0.12 mm.

Subsequently, the porous supporting layer roll produced in the manner as above was unwound, 6.0 mass % m-PDA was applied onto the polysulfone surface, nitrogen was sprayed thereon through an air nozzle to remove the excessive aqueous solution from the surface of the supporting membrane, and thereafter an n-decane solution containing 0.165 mass % trimesic acid chloride at a temperature of 25° C. was applied so as to completely wet the surface to obtain a separation membrane. Thus produced, the separation membrane was folded and cut to have an effective area as a separation membrane element of 37.0 m², and as a feed-side channel member, a net (thickness: 0.78 mm, pitch: 5 mm×5 mm, fiber diameter: 0.39 mm, projected area ratio: 0.12) was combined to obtain a separation membrane leaf having a width of 900 mm and a leaf length of 800 mm.

On the other hand, projections were formed entirely on a sheet (polyethylene terephthalate nonwoven fabric, single fiber fineness: 1 decitex, thickness: about 30 µm, air permeability: 2.5 ml/cm²/sec). Specifically, using a gravure roll having grooves differing in height in the circumferential direction under temperature control of the backup roll to 15° C., a resin composition containing 75 mass % of polypropylene (MFR 1000 g/10 min at a temperature of 230° C. and under a load of 2.16 kgf/cm²) and 25 mass % of low-crystalline α-olefin polymer (Idemitsu Kosan's low-stereoregularity polypropylene "L-MODU•S400" (trade name)) was applied onto a sheet to produce a sheet having projections fixed thereto. The resin temperature was 200° C., and the working speed was 5.0 m/sec.

The pattern engraved on the surface of the gravure roll was linear continuing in the lengthwise direction of the sheet. Regarding the shape of the resultant projections, the channel member width was 0.4 mm, the distance between the neighboring channel members was 0.4 mm, and the pitch was 0.8 mm. Here, the pitch is an average value obtained by measuring horizontal distances between the highest positions in adjacent high portions at 200 sites in the permeate-side face of the separation membrane and averaging these measurement values. The maximum value, the minimum value, a ratio of maximum value/minimum value and the variation coefficient of the measured projection heights are shown in Table 1. The tensile strength and the tensile elongation in the machine direction and the cross direction of the sheet constituting the permeate-side channel member, and the tensile strength in the machine direction of the sheet having the projections fixed thereto are shown in Table 1. The height variation of the permeate-side channel members and the peelability of the permeate-side channel members were evaluated, and the values shown in Table 2 were obtained.

The sheets having the projections fixed thereto was stacked on the permeate-side face of the resultant leaf, and spirally wound around an ABS-made water collection tube (width: 1,020 mm, diameter; 30 mm, 40 holes×one linear line), and a film was further wound around the outer periphery thereof. After fixed with a tape, this was processed for edge cutting, end plate attachment and filament winding to produce an 8-inch separation membrane element. The resultant separation membrane element was loaded in a pressure vessel, and tested according to a maneuvering test to determine the fresh water production rate, the TDS removal ratio and the membrane sinking amount. The data are shown in Table 2.

Hereinunder separation membranes were produced under the same conditions as in Example 1 unless otherwise specifically indicated.

Examples 2 to 7

Separation membranes were produced in the same manner as in Example 1, except that the maximum value, the minimum value, a ratio of maximum value/minimum value and the variation coefficient of the projection heights and the tensile strength in the machine direction of the sheet having the projections fixed thereto were changed as shown in Table 1. The height variation of the permeate-side channel members and the peelability of the permeate-side channel members were evaluated, and the values shown in Table 2 were obtained. The 8-inch separation membrane element was tested in a maneuvering test to measure the fresh water production rate, the TDS removal ratio and the membrane sinking amount. Table 2 shows the obtained data.

Examples 8 to 15

The maximum value, the minimum value, a ratio of maximum value/minimum value and the variation coefficient of the projection heights were changed as shown in Table 1. Also, the thickness, the air permeability, and the tensile strength and the tensile elongation in the machine direction and the cross direction of the sheet constituting the permeate-side channel member, and the tensile strength in the machine direction of the sheet having the projections fixed thereto were changed as shown in Table 1. The height variation of the permeate-side channel members and the peelability of the permeate-side channel members were evaluated, and the values shown in Table 2 were obtained.

The sheet having projections fixed thereto and the sheet with no projections were stacked on the permeate-side of the resultant leaf, and spirally wound around an ABS-made water collection tube (width; 1,020 mm, diameter; 30 mm, 40 holes×one linear line), and a film was further wound around the outer periphery thereof. After fixed with a tape, this was processed for edge cutting, end plate attachment and filament winding to produce an 8-inch separation membrane element. The resultant separation membrane element was loaded in a pressure vessel, and tested according to a maneuvering test to determine the fresh water production rate, the TDS removal ratio and the membrane sinking amount. The data are shown in Table 2.

TABLE 1

| | | Projections | | | | | Configuration of Permeate-side Channel Member | | | | | |
|---|---|---|---|---|---|---|---|---|---|---|---|---|
| | | Height | | | | Projections-fixed Sheet Tensile Strength (machine direction) N/5 cm | Number of sheets existing between permeate-side faces of neighboring separation membrane leaves number of sheets | Contact of sheet side and separation membrane substrate side of permeate-side channel members | Sheet | | | |
| | | maximum value mm | minimum value mm | maximum height/minimum height mm | variation coefficient | Impregnation Ratio into Sheet % | | | | Tensile Strength (machine direction) N/5 cm | Tensile Strength (cross direction) N/5 cm | Tensile Elongation (machine direction) % | Tensile Elongation (cross direction) % |
| Ex. | 1 | 0.30 | 0.20 | 1.50 | 0.140 | 11 | 48 | 1 | not in contact | 37 | 14 | 4 | 2 |
| | 2 | 0.22 | 0.20 | 1.10 | 0.020 | 86 | 48 | 1 | not in contact | 37 | 14 | 4 | 2 |
| | 3 | 0.24 | 0.20 | 1.20 | 0.053 | 25 | 48 | 1 | not in contact | 37 | 14 | 4 | 2 |
| | 4 | 0.22 | 0.20 | 1.10 | 0.053 | 25 | 48 | 1 | not in contact | 37 | 14 | 4 | 2 |
| | 5 | 0.22 | 0.20 | 1.10 | 0.053 | 25 | 213 | 1 | not in contact | 37 | 14 | 4 | 2 |
| | 6 | 0.22 | 0.20 | 1.10 | 0.053 | 25 | 56 | 1 | not in contact | 37 | 14 | 4 | 2 |
| | 7 | 0.22 | 0.20 | 1.10 | 0.053 | 25 | 788 | 1 | not in contact | 37 | 14 | 4 | 2 |
| | 8 | 0.22 | 0.20 | 1.10 | 0.053 | 25 | 48 | 2 | not in contact | 37 | 14 | 4 | 2 |
| | 9 | 0.22 | 0.20 | 1.10 | 0.053 | 25 | 213 | 2 | not in contact | 37 | 14 | 4 | 2 |
| | 10 | 0.22 | 0.20 | 1.10 | 0.053 | 25 | 213 | 2 | in contact | 37 | 14 | 4 | 2 |
| | 11 | 0.22 | 0.20 | 1.10 | 0.053 | 25 | 213 | 2 | in contact | 145 | 71 | 21 | 12 |
| | 12 | 0.22 | 0.20 | 1.10 | 0.053 | 25 | 213 | 2 | in contact | 200 | 150 | 44 | 31 |
| | 13 | 0.22 | 0.20 | 1.10 | 0.053 | 25 | 213 | 2 | in contact | 70 | 18 | 5 | 3 |
| | 14 | 0.11 | 0.10 | 1.10 | 0.053 | 25 | 213 | 2 | in contact | 145 | 71 | 21 | 12 |
| | 15 | 0.11 | 0.10 | 1.10 | 0.053 | 25 | 213 | 3 | in contact | 145 | 71 | 21 | 12 |
| Comp. Ex. | 1 | 0.22 | 0.21 | 1.05 | 0.012 | 8 | 48 | 1 | not in contact | 37 | 14 | 4 | 2 |
| | 2 | 0.29 | 0.18 | 1.61 | 0.180 | 5 | 48 | 1 | not in contact | 37 | 14 | 4 | 2 |

TABLE 2

| | | Stability of Wound Body Average Height of Permeate-side Channel Members in Separation Membrane having been Wound, Stored and Unwound/Average Height of Permeate-side Channel Members in Separation Membrane before Winding — | Peelability of Projections Peeled Sites after Unwinding number | Maneuvering Test | | |
|---|---|---|---|---|---|---|
| | | | | Fresh Water Production Rate m³/d | TDS Removal Ratio % | Membrane Sinking amount % |
| Ex. | 1 | 0.96 | 2 | 15.7 | 99.1 | 39 |
| | 2 | 0.97 | 0 | 15.8 | 99.1 | 36 |
| | 3 | 0.97 | 0 | 15.8 | 99.1 | 35 |
| | 4 | 0.98 | 0 | 15.9 | 99.1 | 34 |
| | 5 | 1.00 | 0 | 16.0 | 99.1 | 34 |
| | 6 | 0.99 | 0 | 15.9 | 99.1 | 34 |
| | 7 | 0.99 | 0 | 16.0 | 99.1 | 34 |
| | 8 | 0.98 | 0 | 16.9 | 99.2 | 31 |
| | 9 | 1.00 | 0 | 16.9 | 99.3 | 31 |
| | 10 | 1.00 | 0 | 19.9 | 99.6 | 28 |
| | 11 | 1.00 | 0 | 22.3 | 99.6 | 22 |
| | 12 | 1.00 | 0 | 21.9 | 99.6 | 24 |
| | 13 | 1.00 | 0 | 22.0 | 99.6 | 24 |
| | 14 | 1.00 | 0 | 25.3 | 99.7 | 6 |
| | 15 | 1.00 | 0 | 26.5 | 99.7 | 4 |

TABLE 2-continued

| | | Stability of Wound Body Average Height of Permeate-side Channel Members in Separation Membrane having been Wound, Stored and Unwound/Average Height of Permeate-side Channel Members in Separation Membrane before Winding | Peelability of Projections Peeled Sites after Unwinding number | Maneuvering Test | | |
|---|---|---|---|---|---|---|
| | | | | Fresh Water Production Rate m³/d | TDS Removal Ratio % | Membrane Sinking amount % |
| Comp. | 1 | 0.89 | 22 | 11.8 | 98.4 | 45 |
| Ex. | 2 | 0.83 | 10 | 11.8 | 97.8 | 44 |

In the description, the present invention has been illustrated in detail by reference to the specified embodiments. It will, however, be apparent to one skilled in the art that various changes and modifications can be made therein without departing from the spirit and scope of the invention. The present application is based on Japanese Patent Application No. 2013-226340 filed on Oct. 31, 2013, Japanese Patent Application No. 2013-268548 filed on Dec. 26, 2013 and Japanese Patent Application No. 2014-131409 filed on Jun. 26, 2014, the contents of which are incorporated herein by reference.

DESCRIPTION OF REFERENCE NUMERALS AND SIGNS

100 Separation membrane element
2 Separation Membrane
2a First separation membrane
2b Second separation membrane
2c Third separation membrane
21 Feed-side face
21a, 21b, 21c Feed-side face
22 Permeate-side face
22a, 22b, 22c Permeate-side face
201 Substrate
202 Porous supporting layer
203 Separation Functional layer
31 Permeate-side channel member
301 Projection
302 Sheet
D1 Maximum impregnation depth of projections into sheet
D2 Sheet thickness
303A1 Separation membrane
303A2 Separation membrane (after maneuvering test)
303B1 Separation membrane
4 Separation membrane leaf
5 Permeate-side flow channel
6 Water collection tube
7 Separation membrane
R2 Region including from the top to the tail of the permeate-side channel members aligning from inside to outside in the winding direction in separation membrane
R3 Region not having permeate-side channel member at the outside edge in the winding direction of separation membrane
L1 Length of entire separation membrane (above-mentioned length a)
L2 Length of region R2
L3 Length of region R3

The invention claimed is:

1. A separation membrane element comprising: a water collection tube; and a plurality of separation membrane leaves stacked on each other and wound around the water collection tube,
wherein each of the separation membrane leaves comprises one or more separation membranes each having a feed-side face and a permeate-side face and is configured so that the feed-side faces face each other,
a sheet having a plurality of projections fixed thereto is provided between the permeate-side faces of the separation membrane leaves stacked on each other, wherein the plurality of projections are impregnated into the sheet,
regarding a height of the projections, a ratio of the maximum height to the minimum height of one projection in the cross section in a lengthwise direction of the separation membrane is from 1.10 to 1.50, and a variation coefficient of the height of the projections in one and the same plane is from 0.02 to 0.15, and
an impregnation ratio of the projections into the sheet is from 10% to 100%.

2. The separation membrane element according to claim 1, wherein the sheet having the projections fixed thereto has a tensile strength in a lengthwise direction thereof of from 50 N/5 cm to 800 N/5 cm.

3. The separation membrane element according to claim 1, which has a plurality of sheets between the permeate-side faces of the separation membrane leaves stacked on each other, wherein the plurality of projections are fixed to at least one of the sheets.

4. The separation membrane element according claim 1, wherein the projections each have a lower bottom length on a side where the projections are fixed to the sheet, which is larger than a upper bottom length thereof, and the projections are arranged so that a face of the sheet not having the plurality of projections is kept in contact with the permeate-side face of the separation membrane leaf.

5. The separation membrane element according claim 1, wherein the sheet has the tensile strength in the lengthwise direction thereof of from 40 N/5 cm to 600 N/5 cm, a tensile strength in a widthwise direction thereof of from 15 N/5 cm to 500 N/5 cm, a tensile elongation in the lengthwise direction thereof of from 5% to 50%, and a tensile elongation in the widthwise direction thereof of from 3% to 40%.

* * * * *